US011377005B2

(12) United States Patent
Iwasaki et al.

(10) Patent No.: US 11,377,005 B2
(45) Date of Patent: Jul. 5, 2022

(54) VEHICLE AIR CONDITIONING DEVICE

(71) Applicant: TOYOTA JIDOSHA KABUSHIKI KAISHA, Toyota (JP)

(72) Inventors: Keita Iwasaki, Toyota (JP); Keiichi Kondo, Chiryu (JP); Shuichi Ui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 16/130,170

(22) Filed: Sep. 13, 2018

(65) Prior Publication Data
US 2019/0135146 A1 May 9, 2019

(30) Foreign Application Priority Data
Nov. 6, 2017 (JP) .............................. JP2017-214057

(51) Int. Cl.
*B60N 2/56* (2006.01)
*B60H 1/00* (2006.01)

(52) U.S. Cl.
CPC ....... *B60N 2/5635* (2013.01); *B60H 1/00285* (2013.01); *B60N 2/565* (2013.01); *B60N 2/5657* (2013.01); *B60N 2/5642* (2013.01); *B60N 2205/30* (2013.01)

(58) Field of Classification Search
CPC .... B60N 2/5635; B60N 2/565; B60N 2/5657; B60N 2205/30; B60N 2/5642; B60H 1/00285
USPC ........................................................ 454/120
See application file for complete search history.

(56) References Cited

U.S. PATENT DOCUMENTS

| 2,430,335 A * | 11/1947 | Hart ................... B60H 1/00207 454/120 |
| 2,480,335 A * | 8/1949 | Nordmark ............. B60R 22/415 297/480 |
| 2004/0031602 A1 | 2/2004 | Sugiura |
| 2012/0129439 A1* | 5/2012 | Ota ........................ B60H 1/242 454/120 |
| 2013/0210331 A1 | 8/2013 | Krammer |
| 2015/0140915 A1* | 5/2015 | Rawlinson ............... B60N 2/22 454/120 |
| 2015/0165865 A1* | 6/2015 | Park ....................... B60N 2/565 62/3.2 |
| 2017/0181225 A1* | 6/2017 | Inaba ................... B60N 2/5657 |

FOREIGN PATENT DOCUMENTS

| CN | 103204045 A | 7/2013 |
| CN | 106028874 A | 10/2016 |
| DE | 102014108303 A1 | 6/2015 |
| EP | 2617588 A1 | 7/2013 |

(Continued)

*Primary Examiner* — Steven B McAllister
*Assistant Examiner* — Benjamin W Johnson
(74) *Attorney, Agent, or Firm* — Oliff PLC

(57) ABSTRACT

A vehicle air conditioning device includes: a sucking section provided at a seat that is disposed over a floor portion of a cabin, the sucking section configured to suck air via the seat from a vehicle front side relative to the seat, from a floor portion side relative to a vehicle vertical direction middle of the cabin; and a guiding section configured to guide air sucked by the sucking section toward the floor portion side at a vehicle rear side relative to the seat or toward a vehicle upper side.

6 Claims, 17 Drawing Sheets

(56) References Cited

FOREIGN PATENT DOCUMENTS

| | | |
|---|---|---|
| JP | S60-081112 U | 6/1985 |
| JP | 2005-348997 A | 12/2005 |
| JP | 2005-349935 A | 12/2005 |
| JP | 2007-237999 A | 9/2007 |
| JP | 2016-068733 A | 5/2016 |
| JP | 2017-511765 A | 4/2017 |
| WO | 2015/123585 A1 | 8/2015 |

* cited by examiner

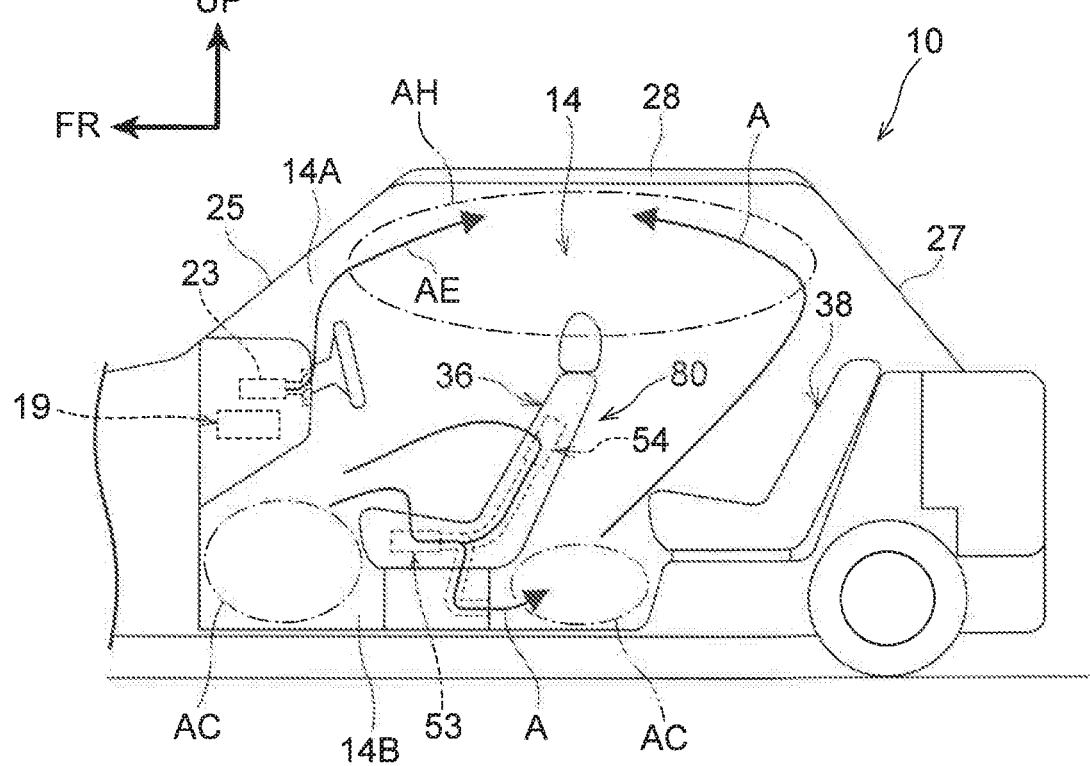
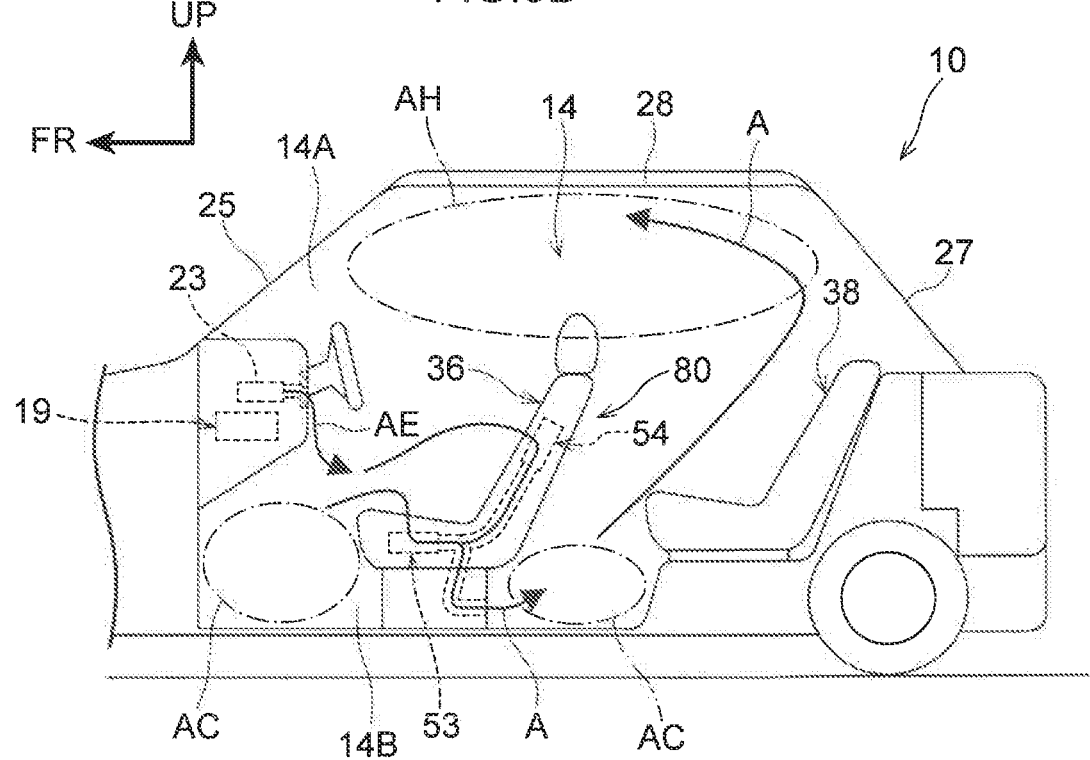

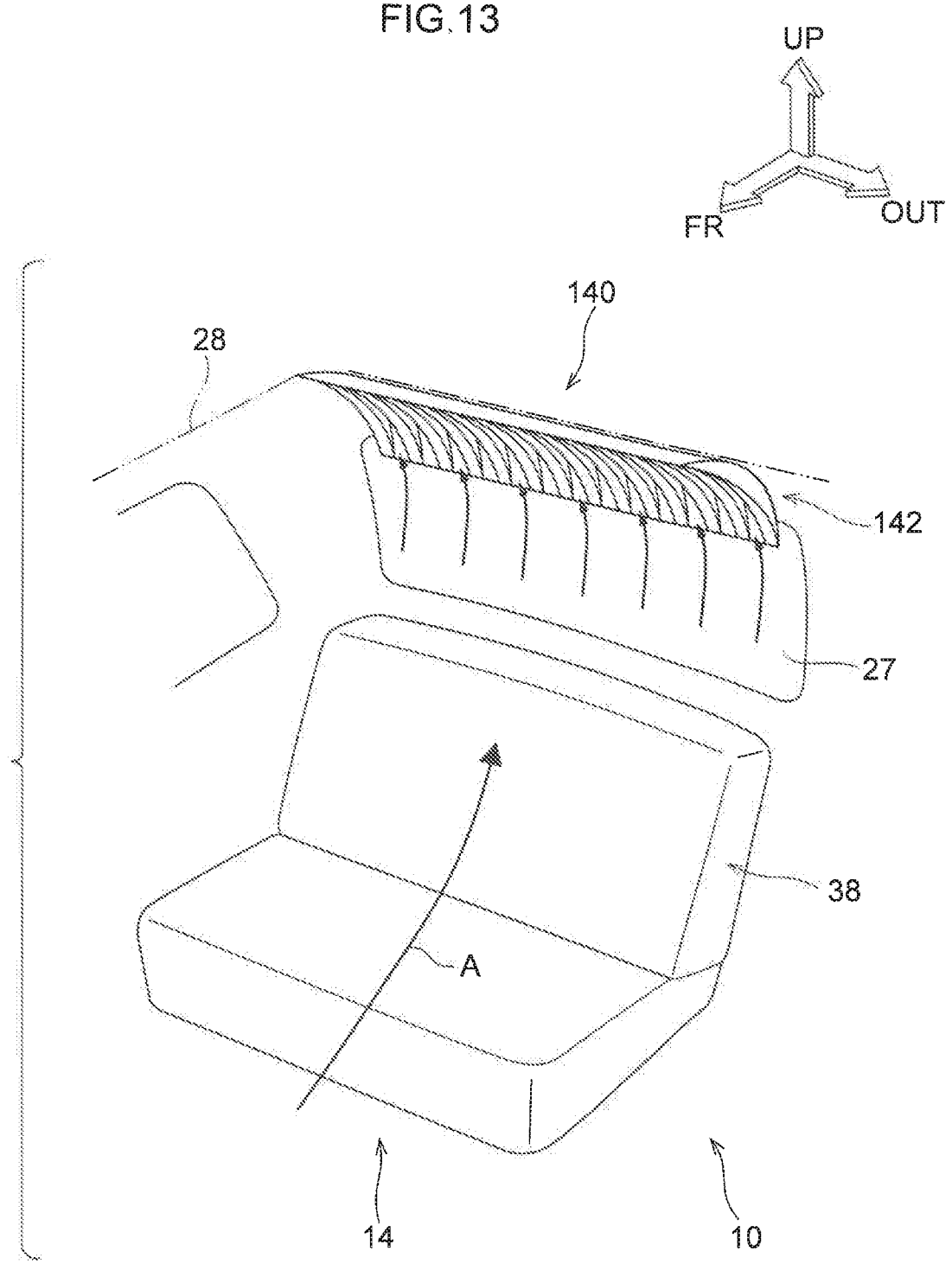

VEHICLE AIR CONDITIONING DEVICE

CROSS-REFERENCE TO RELATED APPLICATION

This application claims priority under 35 USC 119 from Japanese Patent Application No. 2017-214057, filed on Nov. 6, 2017, the disclosure of which is incorporated by reference herein.

BACKGROUND

Technical Field

The present disclosure relates to a vehicle air conditioning device.

Related Art

Japanese Patent Application Laid-Open (JP-A) No. 2016-68733 discloses a vehicle air conditioning device that includes a respectively independent front seat air conditioning device and rear seat air conditioning device. The rear seat air conditioning device is disposed in a center console.

An upper portion of a cabin interior tends to go to a high-temperature state above an ambient temperature, due to air being warmed by sunlight that enters through window glass, higher temperature air tending to rise and pool, and the like. Meanwhile, a lower portion of the cabin interior tends to go to a low-temperature state below the ambient temperature, due to being shaded from sunlight by seats and the like, lower temperature air tending to sink and pool, and the like. As a result of these factors, a temperature difference between a temperature of air in the upper portion of the cabin interior and a temperature of air in the lower portion of the cabin interior tends to increase.

A method of using an air conditioning device at the front side of a cabin interior for actively cooling the upper portion of the cabin interior in a high-temperature state can be considered. However, with this method, low-temperature air in the lower portion of the cabin interior is also cooled unnecessarily. Therefore, there is scope for improvement in regard to suppressing a temperature difference between the temperature of air in the upper portion of a cabin interior and the temperature of air in the lower portion of the cabin interior. In addition, the rear side of a cabin interior is not effectively utilized when all of the air in the upper portion of a cabin interior is cooled by an air conditioning device at the front side of the cabin interior. Thus, there is scope for improvement in implementing cooling efficiently. That is, there is scope for improvement in efficiently suppressing an increase in the difference between a temperature of air in the upper portion of a cabin interior and a temperature of air in the lower portion of the cabin interior.

SUMMARY

The present disclosure provides a vehicle air conditioning device that may suppress an increase in a difference between a temperature of air in an upper portion of a cabin interior and a temperature of air in a lower portion of the cabin interior.

A first aspect of the present disclosure is a vehicle air conditioning device, including: a sucking section provided at a seat that is disposed over a floor portion of a cabin, the sucking section configured to suck air via the seat from a vehicle front side relative to the seat, from a floor portion side relative to a vehicle vertical direction middle of the cabin; and a guiding section configured to guide air sucked by the sucking section toward the floor portion side at a vehicle rear side relative to the seat or toward a vehicle upper side.

In a state in which the vehicle air conditioning device is not operating, air that is warmed by direct sunlight and the like, and is at a high temperature above an ambient temperature tends to pool in an upper portion of the cabin interior, which is at the upper side relative to the vehicle vertical direction middle of the cabin. Meanwhile, air at a lower temperature than a temperature of the air pooling in the upper portion of the cabin interior tends to pool in a lower portion of the cabin interior, including a space at the floor portion side relative to the vehicle vertical direction middle of the cabin that is at the vehicle front side relative to the seat. If this state continues, the difference between the temperature of the air in the upper portion of the cabin interior and the temperature of the air in the lower portion of the cabin interior tends to increase.

In the first aspect, air is sucked via the seat from the lower portion of the cabin interior by the sucking section. As a result, the low-temperature air pooling in the lower portion of the cabin interior flows toward the sucking section at the seat. Then, the air that has flowed toward the sucking section at the seat is guided by the guiding section toward the floor portion side at the vehicle rear side relative to the seat, or toward the vehicle upper side.

Low-temperature air that has pooled at the floor portion side at the vehicle rear side is pushed out toward the vehicle rear side thereof by the air guided by the guiding section. Hence, the air that is pushed out toward the vehicle rear side flows toward the upper portion of the cabin interior along various portions at the rear side of the cabin interior (a wall portion, a window portion and the like). Alternatively, air that is guided toward the vehicle upper side from the seat by the guiding section simply flows to the upper portion of the cabin interior.

That is, because low-temperature air at the lower portion of the cabin interior is caused to flow toward the upper portion of the cabin interior via the seat by the sucking section and the guiding section, high-temperature air in the upper portion of the cabin interior is cooled by the low-temperature air from the lower portion of the cabin interior. Because this cooling is implemented using air from the lower portion of the cabin interior, the temperature of the air in the upper portion of the cabin interior is brought closer to the temperature of the air in the lower portion of the cabin interior but does not go to a lower temperature than the temperature of the air in the lower portion of the cabin interior. Moreover, because air flows to the vehicle rear side relative to the seat, air at the rear side of the cabin interior is utilized effectively. Due to these operations, an increase in the difference between the temperature of the air in the upper portion of the cabin interior and the temperature of the air in the lower portion of the cabin interior may be efficiently suppressed.

In a second aspect of the present disclosure, in the first aspect described above, the seat may include a front seat; the sucking section may be configured to suck air via the front seat; and the guiding section may be configured to guide air sucked by the sucking section toward the floor portion side of a rear seat.

In the second aspect, the air pooled over the floor portion at the front side of the front seat is sucked by the sucking section, and the sucked air is guided toward the floor portion side of the rear seat by the guiding section. A portion of the air guided toward the floor portion side of the rear seat pushes out air pooled over the floor portion at the rear seat toward the various portions at the rear side of the cabin interior (a wall portion, a window portion and the like). The air that has been pushed out flows toward the upper portion of the cabin interior along the various portions at the rear side of the cabin interior. Thus, when air in the upper portion of the cabin interior is being cooled, both air pooled over the floor portion at the rear seat and air pooled over the floor portion at the front side of the front seat are utilized. Therefore, it is easier to cool the air in the upper portion of the cabin interior.

In a third aspect of the present disclosure, in the aspects described above, the seat may include a rear seat; the sucking section may be configured to suck air via at least the rear seat, and the guiding section may be configured to guide air sucked by the sucking section at the rear seat toward the vehicle upper side of the rear seat.

In the third aspect, air over the floor portion at the rear seat is sucked by the sucking section and is guided toward the vehicle upper side by the guiding section. That is, air over the floor portion at the front side of the rear seat is caused to flow toward the upper portion of the cabin interior. Therefore, when the upper portion of the cabin interior is being cooled, air amounts flowing toward the upper portion of the cabin interior may be increased compared to a configuration in which the sucking section and the guiding section are not provided at the rear seat.

In a fourth aspect of the present disclosure, in the aspects described above, the seat may include a seat cushion portion on which a vehicle occupant can sit, and the sucking section may be configured to suck air via the seat cushion portion.

In the fourth aspect, because the sucking section sucks air via the seat cushion portion that is closer to the floor portion than a seat back portion, the sucking section may suck lower temperature air from closer to the floor portion than in a configuration in which a sucking section is provided only at a seat back portion.

In a fifth aspect of the present disclosure, in the fourth aspect described above, the seat may include a seat back portion that extends to the vehicle upper side from the seat cushion portion; the sucking section may include a first sucking section configured to suck air via the seat cushion portion, and a second sucking section configured to suck air via the seat back portion; and the guiding section may include a first duct configured to guide air flowing from the first sucking section toward the floor portion side at the vehicle rear side relative to the seat, and a second duct configured to guide air sucked by the second sucking section toward the first sucking section.

In the fifth aspect, a portion of the air pooled over the floor portion at the front side of the seat is sucked via the seat cushion portion by the first sucking section and is guided toward the floor portion side at the vehicle rear side relative to the seat by the first duct. Another portion of the air pooled over the floor portion at the front side of the seat is sucked via the seat back portion by the second sucking section and is guided toward the first sucking section by the second duct. The air guided by the second duct is guided toward the floor portion side at the vehicle rear side relative to the seat by the first duct, together with the air sucked by the first sucking section. Thus, both the first sucking section at the seat cushion portion and the second sucking section at the seat back portion are utilized for suction. Therefore, cases in which amounts of air flowing to the vehicle rear side are insufficient with respect to air amounts required to lower the temperature of high-temperature air may be suppressed.

In a sixth aspect of the present disclosure, in the aspects described above, may further include a blowing section at the vehicle front side relative to the seat configured to blow air toward the seat.

In the sixth aspect, air is blown toward the seat by the blowing section. In a configuration in which air is blown toward the upper portion of the seat from the blowing section, high-temperature air in the upper portion of the cabin interior is cooled by the blown air and by low-temperature air flowing from the lower portion of the cabin interior. Alternatively, in a configuration in which air is blown toward the lower portion of the seat from the blowing section, the blown air is sucked by the sucking section together with low-temperature air in the lower portion of the cabin interior, is guided by the guiding section and flows to the upper portion of the cabin interior, and cools high-temperature air in the upper portion of the cabin interior. Thus, amounts of air utilized for cooling of the air in the upper portion of the cabin interior may be increased compared to a configuration in which there is no blowing section.

In a seventh aspect of the present disclosure, in the aspects described above, the seat may include a front seat and a rear seat; and a flow-straightening section configured to straighten a flow of air from the rear seat toward the front seat may be provided in the cabin.

In the seventh aspect, air flowing toward the vehicle upper side from the rear seat is straightened by the flow-straightening section and flows toward the front seat. Therefore, a mass (that is resistant to dispersion) of low-temperature air may be brought into contact with high-temperature air pooled in the upper portion of the cabin interior. Thus, it is easier to lower the temperature of the air in the upper portion of the cabin interior than in a configuration in which there is no flow-straightening section.

According to the aspects described above, the vehicle air conditioning device of the present disclosure may suppress an increase in the difference between a temperature of air in the upper portion of a cabin interior and a temperature of air in the lower portion of the cabin interior.

BRIEF DESCRIPTION OF THE DRAWINGS

Exemplary embodiments will be described in detail based on the following figures, wherein:

FIG. 8A is a descriptive diagram depicting flows of air in a cabin when air is blown upward from the air conditioner according to the second exemplary embodiment;

FIG. 8B is a descriptive diagram depicting flows of air in the cabin when air is blown downward from the air conditioner according to the second exemplary embodiment;

FIG. 13 is a descriptive diagram showing a state in which a flow-straightening member is provided in a cabin according to a fifth exemplary embodiment;

DETAILED DESCRIPTION

First Exemplary Embodiment

Examples of a vehicle 10 and a vehicle air conditioning device 50 according to a first exemplary embodiment are described.

Figure 1:
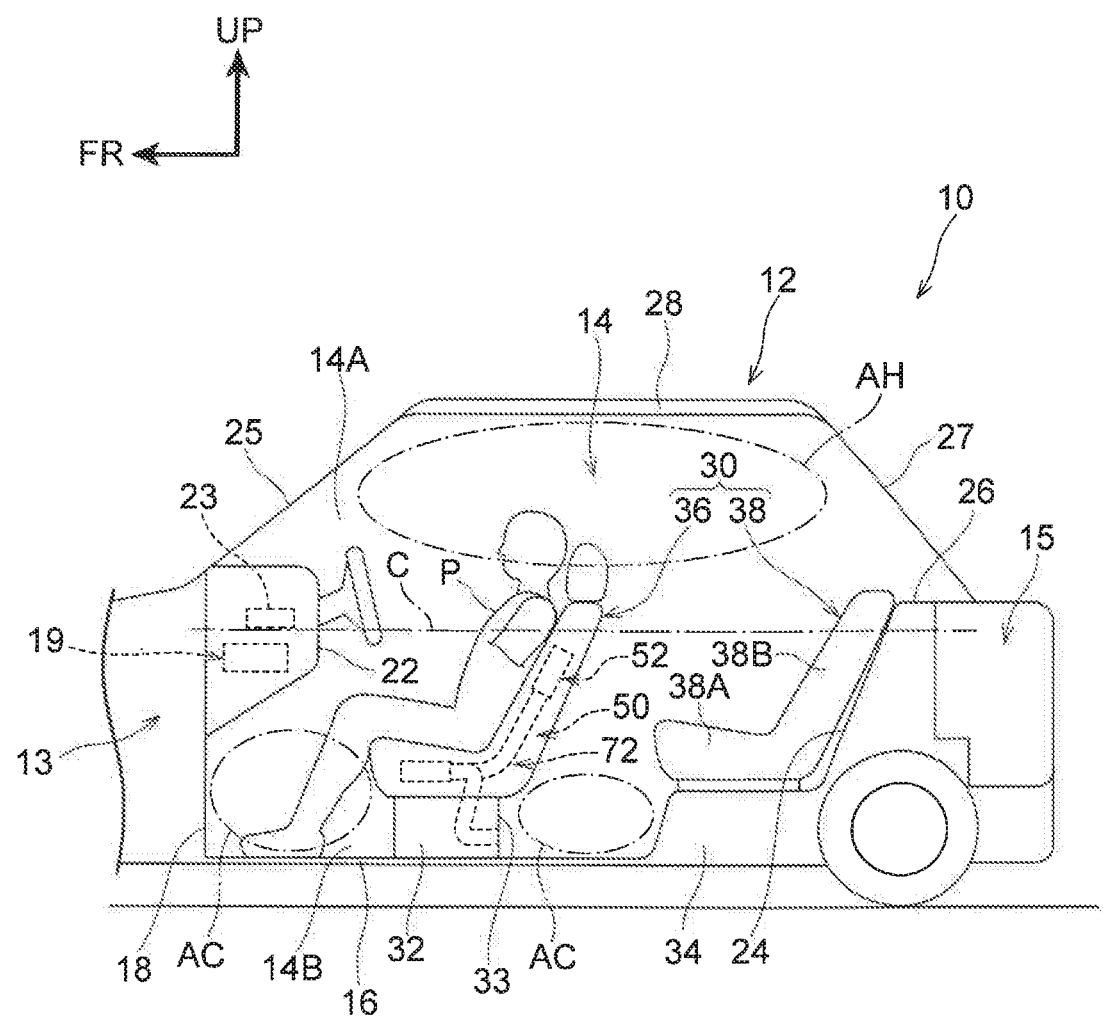
FIG. 1 is a structural diagram of a vehicle in which a vehicle air conditioning device according to a first exemplary embodiment is employed.

FIG. 1 shows a portion of the vehicle 10 in which the vehicle air conditioning device 50 is employed. An arrow FR indicates a vehicle front side (progress direction), an arrow UP indicates a vehicle upper side, and an arrow OUT indicates a vehicle width direction outer side. Herebelow, where descriptions are given simply using the directions front, rear, up, down, left and right, unless otherwise specified, these represent front and rear in the vehicle front-and-rear direction, up and down in the vehicle vertical direction, and left and right in the vehicle width direction if facing in the progress direction.

The vehicle 10 includes a vehicle body 12 provided with a cabin 14, the vehicle air conditioning device 50, which is described below, and a control unit 19 that controls operations of various parts of the vehicle 10. The control unit 19 is equipped with, for example, an electronic control unit (ECU), which is not shown in the drawings. The ECU is constituted by a microcomputer including a central processing unit (CPU), a read-only memory (ROM), a random access memory (RAM) and so forth.

The vehicle body 12 includes a floor panel 16, a dash panel 18, an instrument panel 22, a compartment partition panel 24, an upper back panel 26, and a roof panel 28. Portions of the vehicle 10 at both of outer sides in the vehicle width direction are not shown in the drawings or described.

The floor panel 16 is an example of a floor portion of the cabin 14. The floor panel 16 is structured of steel plate extending in the vehicle front-and-rear direction and the vehicle width direction. Seats 30 are disposed over the floor panel 16. The seats 30 are constituted by a front seat 36 and a rear seat 38. The front seat 36 is disposed at the front side relative to the vehicle front-and-rear direction middle of the interior of the cabin 14. The rear seat 38 is disposed at the rear side relative to the middle.

A pedestal portion 32 and a pedestal portion 34 that are formed as protrusions toward the vehicle upper side are provided on the floor panel 16. The pedestal portion 32 is formed in a cuboid shape that is longer in the vehicle width direction than in the vehicle front-and-rear direction. Of side walls structuring the pedestal portion 32, a side wall that is disposed at the vehicle rear side is referred to as a rear wall 33. An aperture portion 33A (see FIG. 5) that opens toward the vehicle rear side is formed in the rear wall 33. The front seat 36 is mounted on the pedestal portion 32. The pedestal portion 34 is formed in a cuboid shape that is longer in the vehicle width direction than in the vehicle front-and-rear direction. The pedestal portion 34 is disposed at the vehicle rear side relative to the pedestal portion 32. The rear seat 38 is mounted on the pedestal portion 34.

Figure 2:
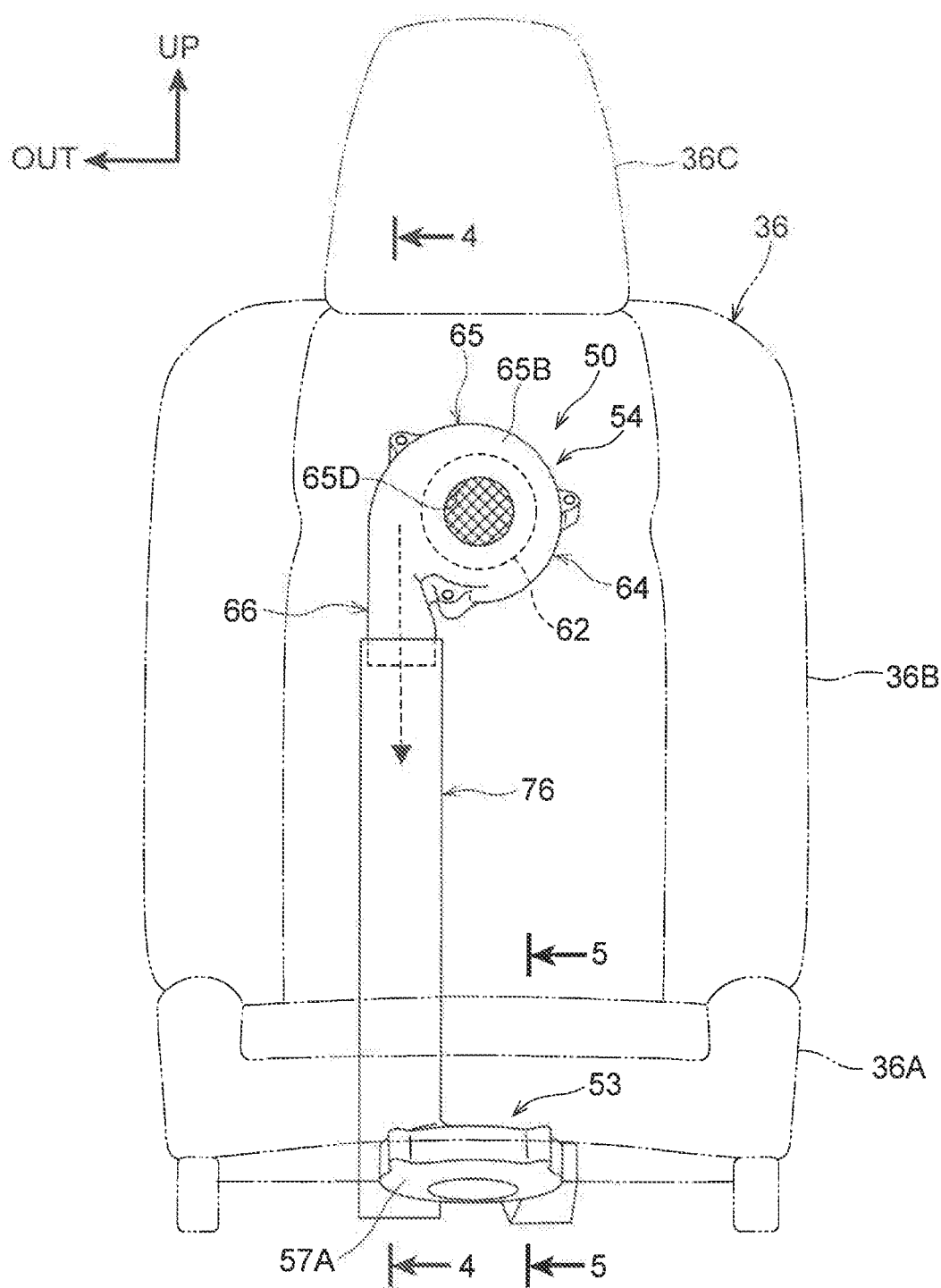
FIG. 2 is a structural diagram in front view of the vehicle air conditioning device according to the first exemplary embodiment.

The front seat 36 shown in FIG. 2 includes a seat cushion portion 36A, a seat back portion 36B and a headrest portion 36C. A vehicle occupant P (see FIG. 1) sits on the seat cushion portion 36A (the seat cushion portion 36A supporting the buttock area and thigh area of the vehicle occupant 1P). The seat back portion 36B supports the back area of the vehicle occupant P. The headrest portion 36C supports the head area of the vehicle occupant P. The seat cushion portion 36A and seat back portion 36B each include a left and right pair of side frames (not shown in the drawings) that structure a framework.

The upper side and front side of each pair of side frames are covered by a seat pad (not shown in the drawings) constituted of a foam resin such as foam urethane or the like. The seat pad is covered by a cover material, which is not shown in the drawings. The seat cushion portion 36A is mounted on the pedestal portion 32 (see FIG. 1) using fastening means such as bolts or the like, which are not shown in the drawings. The seat back portion 36B is provided (supported) at a rear end portion of the seat cushion portion 36A to be tiltable in the vehicle front-and-rear direction. The seat back portion 36B extends toward the vehicle upper side from the seat cushion portion 36A. The headrest portion 36C is supported by the seat back portion 36B.

Figure 4:
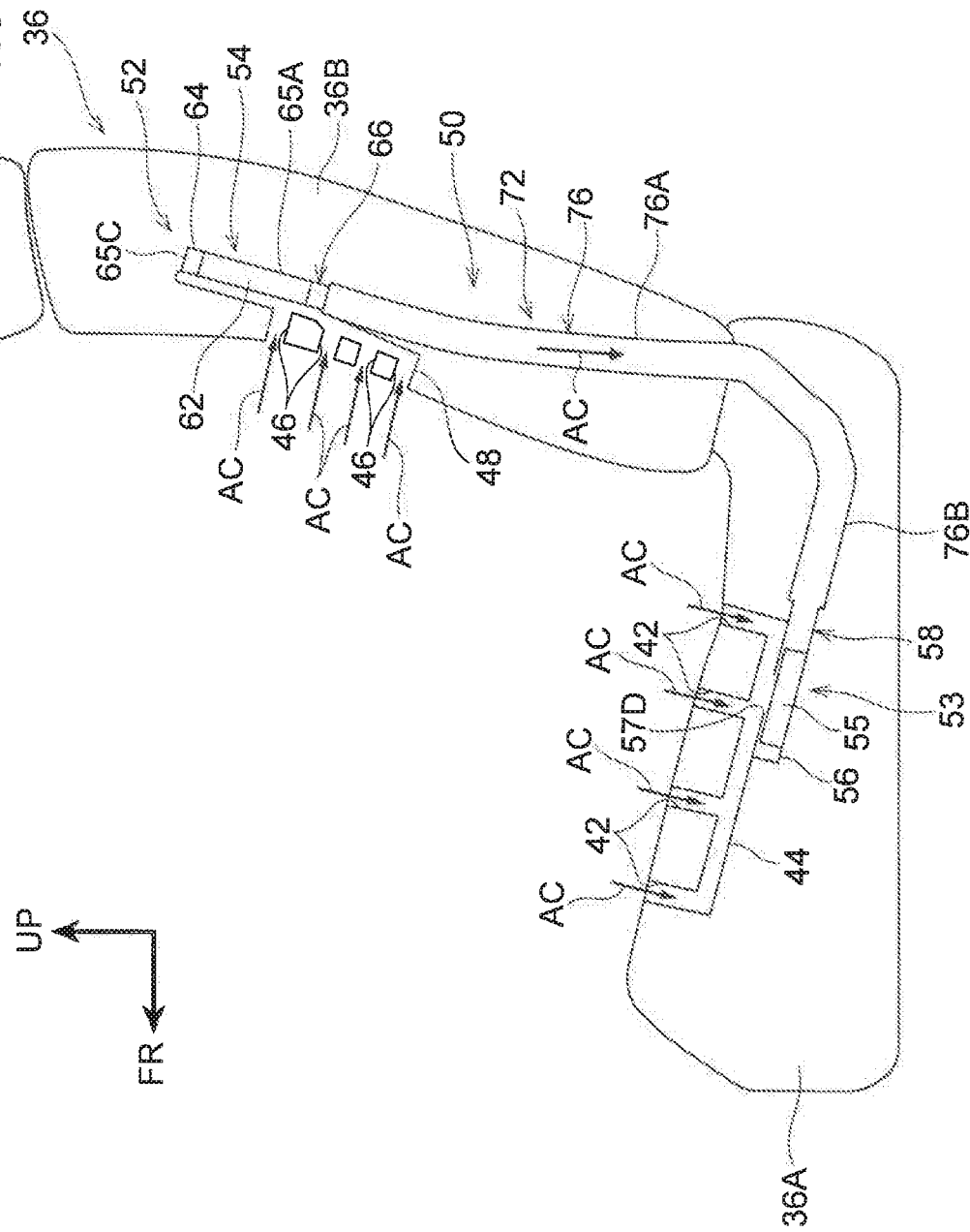
FIG. 4 is a descriptive diagram (a sectional diagram cut along line 4-4 in FIG. 2) depicting a flow of air from a first suction unit to a second suction unit of a front seat according to the first exemplary embodiment.

As shown in FIG. 4, plural ventilation holes 42 for suction are formed in the cover material and seat pad of the seat cushion portion 36A. The plural ventilation holes 42 open toward the vehicle upper side. The plural ventilation holes 42 are connected with a channel member 44. The channel member 44 is formed in a tube shape and is in fluid communication with the insides of the plural ventilation holes 42. The channel member 44 is formed to be capable of inflowing air to inside the channel member 44 through the ventilation holes 42 and exhausting air to outside the channel member 44. End portion of the channel member 44 is connected to a blower case 56, which is described below.

Plural ventilation holes 46 for suction are formed in the cover material and seat pad of the seat back portion 36B. The plural ventilation holes 46 open toward the vehicle front side. The plural ventilation holes 46 are connected with a channel member 48. The channel member 48 is formed in a tube shape and is in fluid communication with the insides of the plural ventilation holes 46. The channel member 48 is formed to be capable of inflowing air to inside the channel member 48 through the ventilation holes 46 and exhausting air to outside the channel member 48. End portion of the channel member 48 is connected to a blower case 64, which is described below.

The rear seat 38 shown in FIG. 1 includes a seat cushion portion 38A and a seat back portion 38B. The seat cushion portion 38A supports the buttock area and thigh area of a vehicle occupant P. The seat back portion 38B supports the back area of the vehicle occupant P. The seat cushion portion 38A and seat back portion 38B each include a left and right pair of side frames (not shown in the drawings) that structure a framework.

The upper side and front side of each pair of side frames are covered by a seat pad (not shown in the drawings) constituted of a foam resin such as foam urethane or the like. The seat pad is covered by a cover material (not shown in the drawings). The seat cushion portion 38A is mounted on the pedestal portion 34 using fastening means such as bolts or the like (not shown in the drawings). The side frames of the seat back portion 38B (not shown in the drawings) are mounted to the compartment partition panel 24, which is described below, using fastening means such as bolts or the like.

The dash panel 18 stands upright at the vehicle front side of the floor panel 16, dividing an engine compartment 13 of the vehicle 10 from the cabin 14. The instrument panel 22 is provided at the cabin 14 side of the dash panel 18 and constitutes internal decor of the cabin 14. An air conditioner 23 is provided at an inner side of the instrument panel 22. The air conditioner 23 blows air toward the front seat 36 through an aperture portion (not shown in the drawings) in the instrument panel 22. In this first exemplary embodiment, the air conditioner 23 is not included in the vehicle air conditioning device 50.

The compartment partition panel 24 extends toward the vehicle upper side at the vehicle rear side of the floor panel 16, dividing the cabin 14 from a luggage compartment 15 of the vehicle 10. The upper back panel 26 extends in the vehicle front-and-rear direction and the vehicle width direction at the vehicle upper side of the luggage compartment 15. A front end portion of the upper back panel 26 is joined to an upper end portion of the compartment partition panel 24. The roof panel 28 extends in the vehicle front-and-rear direction and the vehicle width direction at the vehicle upper side of the front seat 36 and the rear seat 38.

A front window glass 25 and a rear window glass 27 are provided in the vehicle body 12. Viewed in the vehicle width direction, the front window glass 25 extends in a direction diagonally intersecting the vertical direction, from a vicinity of an upper side portion of the instrument panel 22 to a front end portion of the roof panel 28. Viewed in the vehicle width direction, the rear window glass 27 extends in a direction diagonally intersecting the vertical direction, from a vicinity of a rear end portion of the upper back panel 26 to a rear end portion of the roof panel 28.

If the cabin 14 is viewed from a vehicle width direction outer side, an imaginary line joining positions at the middle in the vehicle vertical direction of the cabin 14 in the vehicle front-and-rear direction (represented by the single-dot chain line C) is referred to as "the middle line C". Of spaces inside the cabin 14, spaces at the vehicle upper side relative to the middle line C are referred to as the cabin interior upper region 14A, and spaces at the vehicle lower side relative to the middle line C are referred to as the cabin interior lower region 14B. The cabin interior lower region 14B includes a space at the vehicle front side relative to the seats 30 that is at the floor panel 16 side of the cabin 14 relative to the vehicle vertical direction middle.

The cabin interior upper region 14A tends to go to a high-temperature state above an ambient temperature (25° C.) due to factors such as the air being warmed by sunlight that is incident through the front window glass 25 and the rear window glass 27, higher temperature air tending to rise and pool, and the like. In contrast, the cabin interior lower region 14B tends to go to a low-temperature state below the ambient temperature due to factors such as being shaded from sunlight by the instrument panel 22, the seats 30 and the like, lower temperature air tending to sink and pool, and the like. For these reasons, as the sunlight continues, a temperature difference in the cabin 14 between a temperature of air in the cabin interior upper region 14A and a temperature of air in the cabin interior lower region 14B tends to increase.

Now, the vehicle air conditioning device 50 is described.

Figure 3:
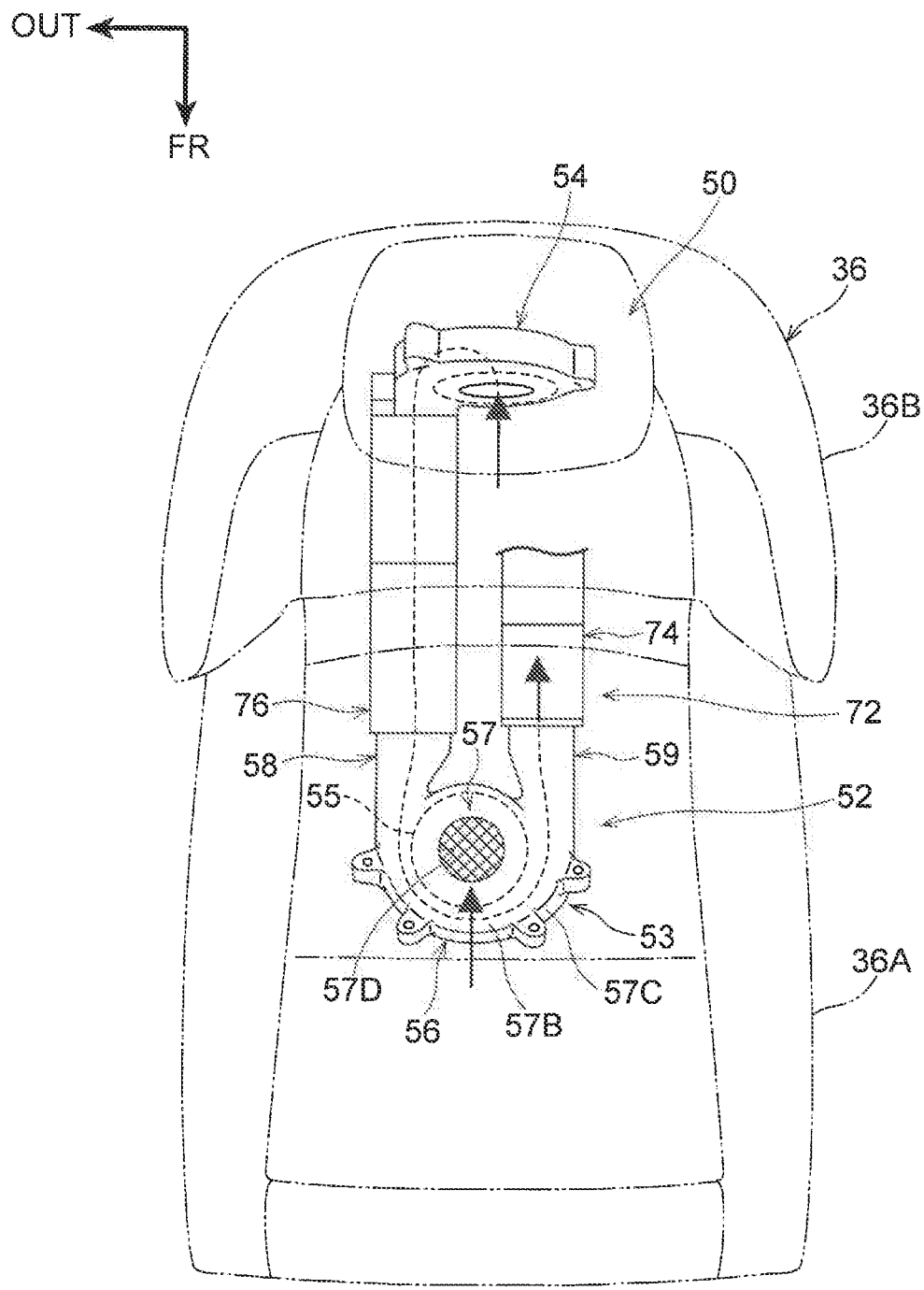
FIG. 3 is a structural diagram in plan view of the vehicle air conditioning device according to the first exemplary embodiment.

The vehicle air conditioning device 50 shown in FIG. 3 includes, for example, a suction unit 52 that sucks air via the front seat 36 and a guide portion 72 that guides the air sucked by the suction unit 52 towards the side of the rear seat 38 at which the floor panel 16 is disposed (see FIG. 1). The suction unit 52 is an example of a sucking section. The guide portion 72 is an example of a guiding section. The front seat 36 may be either of a seat at a driver seat side and a seat at a front passenger seat side.

The suction unit 52 includes, for example, a first suction unit 53 that sucks air via the seat cushion portion 36A and a second suction unit 54 that sucks air via the seat back portion 36B. Operation control of the first suction unit 53 and the second suction unit 54 is controlled by the control unit 19, which is described above (see FIG. 1).

Figure 5:
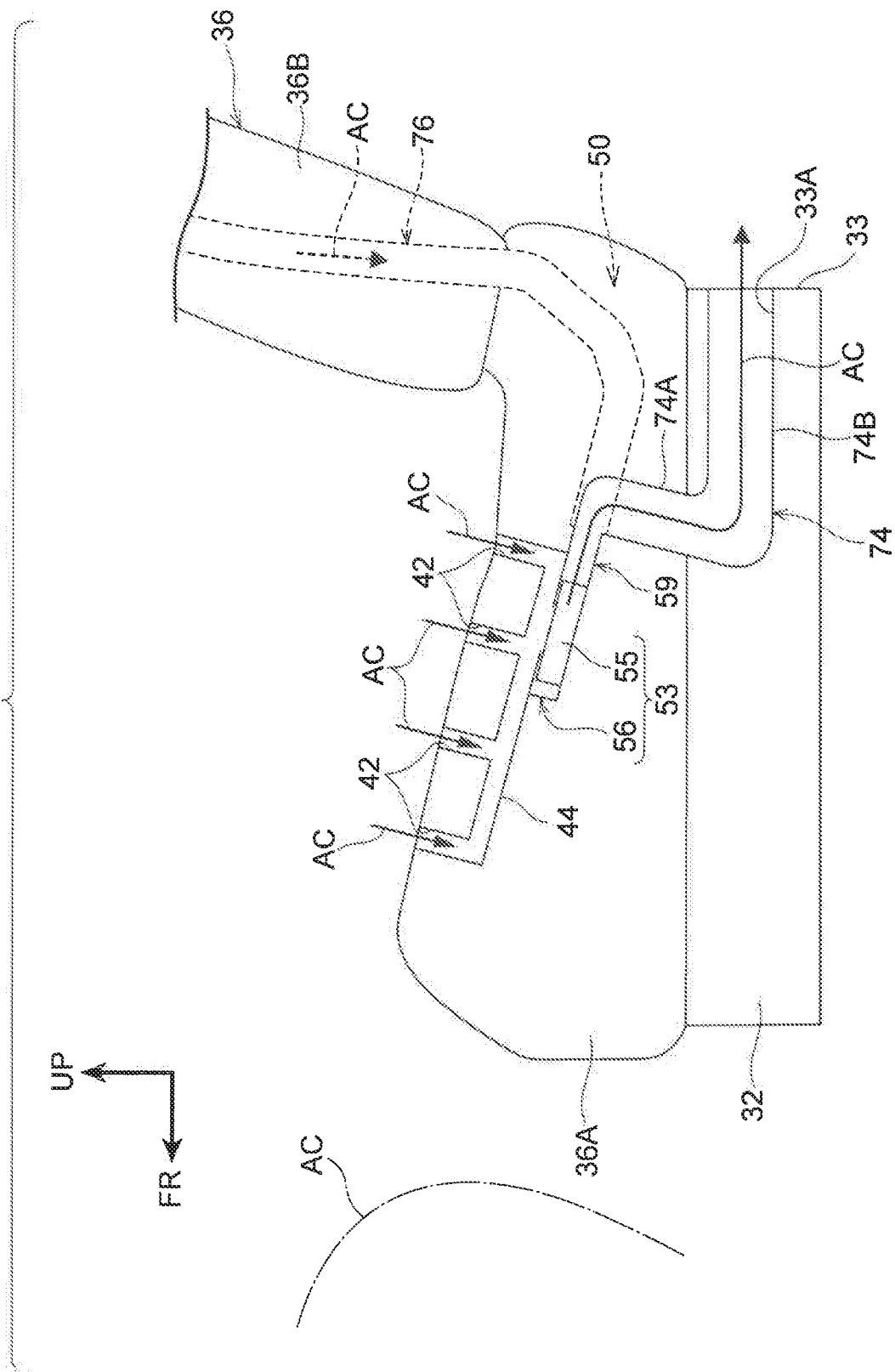
FIG. 5 is a descriptive diagram (a sectional diagram cut along line 5-5 in FIG. 2) depicting a flow of air from the second suction unit to a guide portion of the front seat according to the first exemplary embodiment.

The first suction unit 53 shown in FIG. 5 includes, for example, a first blower 55, which sucks air, and the blower case 56, which guides the air sucked by the first blower 55 in one direction. When the seat cushion portion 36A is viewed from the vehicle vertical direction upper side, the first blower 55 and the blower case 56 are disposed at, for example, a central portion in the vehicle width direction that is at a central portion in the vehicle front-and-rear direction (see FIG. 3).

The first blower 55 is structured with, for example, a multi-vane turbo fan that is rotatable with a direction of the rotation axis thereof being substantially in the vehicle vertical direction. To be specific, the first blower 55 is structured to, by rotating, suck air from the upper side in the vehicle vertical direction and jet air out to the outer side in the diametric direction of the vanes (not shown in the drawings) over the whole circumference thereof. The first blower 55 is, for example, rotated by a motor (not shown in the drawings) being electrified when a switch is switched from an off state to an on state by a vehicle occupant P.

The blower case 56 shown in FIG. 3 is structured by a hollow member and includes, for example, a main body portion 57, an inflow portion 58 and an exhaust portion 59. The first blower 55 is provided at the inside of the main body portion 57. The inflow portion 58 is in fluid communication with the main body portion 57 and inflows air. The exhaust portion 59 is in fluid communication with the main body portion 57 and exhausts air. The blower case 56 is, for example, attached to an already existing side frame using a bracket (not shown in the drawings).

Viewed in the vehicle vertical direction, the main body portion 57 is formed as an annular channel portion encircling the outer periphery of the first blower 55. The main body portion 57 is structured so as to guide the air sucked into the main body portion 57 through the first blower 55 in the rotation direction of the first blower 55. To be specific, the main body portion 57 includes a floor wall 57A (see FIG. 2), an upper wall 57B disposed at the upper side of the floor wall 57A, and a side wall 57C that links between the floor wall 57A and upper wall 57B in the vehicle vertical direction.

A suction aperture 57D is formed in the upper wall 57B. The suction aperture 57D is connected with the channel member 44 (see FIG. 4) so as to enable the inflow of air into the suction aperture 57D from the channel member 44. When the first blower 55 is rotated, air inflows into the main body portion 57 from inside the channel member 44 via the suction aperture 57D. That is, in the first suction unit 53, air is sucked via the channel member 44.

Viewed in the vehicle vertical direction, the inflow portion 58 extends toward the vehicle rear side from a portion at the vehicle right side and vehicle rear side of the main body portion 57. The inflow portion 58 is formed in a square tube shape. A channel cross-sectional area of the inflow portion 58 gradually decreases toward the main body portion 57. A second duct 76, which is described below, is connected to a portion of the inflow portion 58 at the opposite side of the inflow portion 58 from the side that is disposed at the main body portion 57.

Viewed in the vehicle vertical direction, the exhaust portion 59 extends toward the vehicle rear side from a portion at the vehicle left side and vehicle rear side of the main body portion 57. The exhaust portion 59 is formed in a square tube shape. A channel cross-sectional area of the exhaust portion 59 gradually increases away from the main body portion 57. A first duct 74, which is described below, is connected to a portion of the exhaust portion 59 at the opposite side of the exhaust portion 59 from the side that is disposed at the main body portion 57.

The second suction unit 54 shown in FIG. 2 includes, for example, a second blower 62, which sucks air, and the blower case 64, which guides the air sucked by the second blower 62 in one direction. When the seat back portion 36B is viewed from the vehicle front side, the second blower 62 and the blower case 64 are disposed at, for example, a central portion in the vehicle width direction that is at a central portion in the vehicle vertical direction.

The second blower 62 is structured with, for example, a multi-vane turbo fan that is rotatable with a direction of the rotation axis thereof being substantially in the vehicle front-and-rear direction. That is, the second blower 62 is structured so as to, by rotating, suck air from the front side in the vehicle front-and-rear direction and jet air out to the outer side in the diametric direction of the vanes (not shown in the drawings) over the whole circumference thereof. The second blower 62 is, for example, rotated by a motor that is not shown in the drawings being electrified when the switch is switched from the off state to the on state by the vehicle occupant P.

The blower case 64 is structured by a hollow member and includes, for example, a main body portion 65 and an exhaust portion 66. The second blower 62 is provided at the inside of the main body portion 65. The exhaust portion 66 is in fluid communication with the main body portion 65 and exhausts air. The blower case 64 is, for example, attached to an already existing side frame using a bracket (not shown in the drawings).

Viewed in the vehicle front-and-rear direction, the main body portion 65 is formed as an annular channel portion encircling the outer periphery of the second blower 62. The main body portion 65 is structured to guide the air sucked into the main body portion 65 through the second blower 62 in the rotation direction of the second blower 62. To be specific, the main body portion 65 includes a rear wall 65A (see FIG. 4), a front wall 65B disposed at the front side of the rear wall 65A, and a side wall 65C (see FIG. 4) that links between the rear wall 65A and the front wall 65B in the vehicle front-and-rear direction.

A suction aperture 65D is formed in the front wall 65B. The suction aperture 65D is connected with the channel member 48 so as to enable the inflow of air into the suction aperture 65D from the channel member 48 (see FIG. 4). When the second blower 62 is rotated, air inflows into the main body portion 65 from inside the channel member 48 via the suction aperture 65D. That is, in the second suction unit 54, air is sucked via the channel member 48.

Viewed in the vehicle front-and-rear direction, the exhaust portion 66 extends toward the vehicle lower side from a portion at the vehicle right side and vehicle lower side of the main body portion 65. The exhaust portion 66 is formed in a square tube shape. A channel cross-sectional area of the exhaust portion 66 gradually increases away from the main body portion 65. The second duct 76, which is described below, is connected to a portion of the exhaust portion 66 at the opposite side of the exhaust portion 66 from the side that is disposed at the main body portion 65.

As described above, the suction unit 52 shown in FIG. 1 is provided at the front seat 36 and is structured to suck air via the front seat 36 from the vehicle front side relative to the front seat 36, from the floor panel 16 side relative to the vehicle vertical direction middle of the cabin 14.

The guide portion 72 shown in FIG. 3 includes, for example, the first duct 74 that guides air toward the floor panel 16 side at the vehicle rear side relative to the front seat 36 and the second duct 76 that guides air from the second suction unit 54 toward the first suction unit 53.

The first duct 74 shown in FIG. 5 is, for example, constituted of a resiliently deformable resin material, formed in a square tube shape, and capable of distributing air thereinside. Viewed in the vehicle width direction, the first duct 74 as a whole is, for example, inflected in a substantial "L" shape. An upstream side end portion of the first duct 74 with respect to the direction in which air flows is connected to a downstream side end portion of the exhaust portion 59.

To be specific, the first duct 74 includes an upstream portion 74A and a downstream portion 74B. Viewed in the vehicle width direction, the upstream portion 74A extends linearly to the vehicle lower side from a rear end portion of the exhaust portion 59, and the downstream portion 74B extends linearly to the vehicle rear side from a lower end portion of the upstream portion 74A. The upstream portion 74A extends, for example, from the seat cushion portion 36A to the pedestal portion 32. The upstream portion 74A is arranged diagonally such that a lower end portion thereof is disposed at the vehicle front side relative to an upper end portion thereof. The downstream portion 74B extends in the vehicle front-and-rear direction at the inside of the pedestal portion 32. A rear end portion of the downstream portion 74B is connected to a peripheral edge portion of the aperture portion 33A of the pedestal portion 32. Therefore, air that inflows to the inside of the first duct 74 from the first suction unit 53 and flows in the first duct 74 then flows to the vehicle rear side from the aperture portion 33A.

The second duct 76 shown in FIG. 4 is, for example, constituted of a resiliently deformable resin material, formed in a square tube shape, and capable of distributing air thereinside. Viewed in the vehicle width direction, the second duct 76 as a whole is, for example, inflected in a substantial "J" shape. An upstream side end portion of the second duct 76 with respect to the direction in which air flows is connected to a downstream side end portion of the exhaust portion 66.

To be specific, the second duct 76 includes an upstream portion 76A and a downstream portion 76B. Viewed in the vehicle width direction, the upstream portion 76A extends linearly to the vehicle lower side from a lower end portion of the exhaust portion 66. The downstream portion 76B is inflected toward the vehicle front side from a lower end portion of the upstream portion 76A and extends linearly to the vehicle front side. The upstream portion 76A extends, for example, from a vehicle vertical direction middle portion of the seat back portion 36B, beyond a lower end portion of the seat back portion 36B, to a rear end portion of the seat cushion portion 36A.

The downstream portion 76B extends from the rear end portion of the seat cushion portion 36A to the inflow portion 58 of the first suction unit 53. A front end portion (downstream side end portion) of the downstream portion 76B is connected to a peripheral edge portion of an aperture portion of the inflow portion 58, which aperture portion is not shown in the drawings. Therefore, air that is sucked by the second suction unit 54, inflows from the second suction unit 54 into the second duct 76, and flows toward the vehicle lower side in the second duct 76 then flows inside the first suction unit 53. Hence, in the first duct 74, the air from the first suction unit 53 and the air from the second suction unit 54 flow in a mixed state.

As described above, the guide portion 72 shown in FIG. 1 is structured to guide air sucked in at the suction unit 52 toward the floor panel 16 side at the vehicle rear side relative to the front seat 36.

Now, operation of the vehicle air conditioning device 50 according to the first exemplary embodiment is described.

In the vehicle 10 shown in FIG. 1, high-temperature air in the cabin 14 that is warmed by direct sunlight (to a high temperature above an ambient temperature) rises and pools in the cabin interior upper region 14A. The high-temperature air pooled in the cabin interior upper region 14A is referred to as "air AH". Meanwhile, air that is located over the floor panel 16 of the vehicle 10 in a space at the front side relative to the front seat 36, at the lower side relative to the instrument panel 22, is unlikely to be warmed by direct sunlight, is at a lower temperature than the temperature of the air AH, and pools in this space. This low-temperature air is referred to as "air AC". Similarly, the air AC also pools in a space over the floor panel 16 between the front seat 36 and the rear seat 38 and in spaces at the feet of vehicle occupants P. When a vehicle occupant P sitting on the front seat 36 presses a switch (not shown in the drawings) the vehicle air conditioning device 50 starts to operate.

In the vehicle air conditioning device 50 shown in FIG. 4, the first blower 55 of the first suction unit 53 and the second blower 62 of the second suction unit 54 are rotated. To be specific, a portion of the air AC shown in FIG. 5 is sucked into the blower case 56 through the plural ventilation holes 42 and the channel member 44 by the rotation of the first blower 55. The air AC that has been sucked in flows in the exhaust portion 59 and in the first duct 74, and flows (is exhausted) toward the rear seat 38 (see FIG. 1).

Meanwhile, as shown in FIG. 4, another portion of the air AC is sucked into the blower case 64 through the plural ventilation holes 46 and the channel member 48 to by the rotation of the second blower 62. This air AC that has been sucked in flows in the exhaust portion 66 and in the second duct 76 and inflows into the inflow portion 58. Then, as shown in FIG. 5, the air AC inflowing into the inflow portion 58 merges with the air AC inflowing through the ventilation holes 42 and the channel member 44 into the blower case 56, flows in the exhaust portion 59 and in the first duct 74, and flows (is exhausted) toward the rear seat 38 (see FIG. 1).

Figure 6:
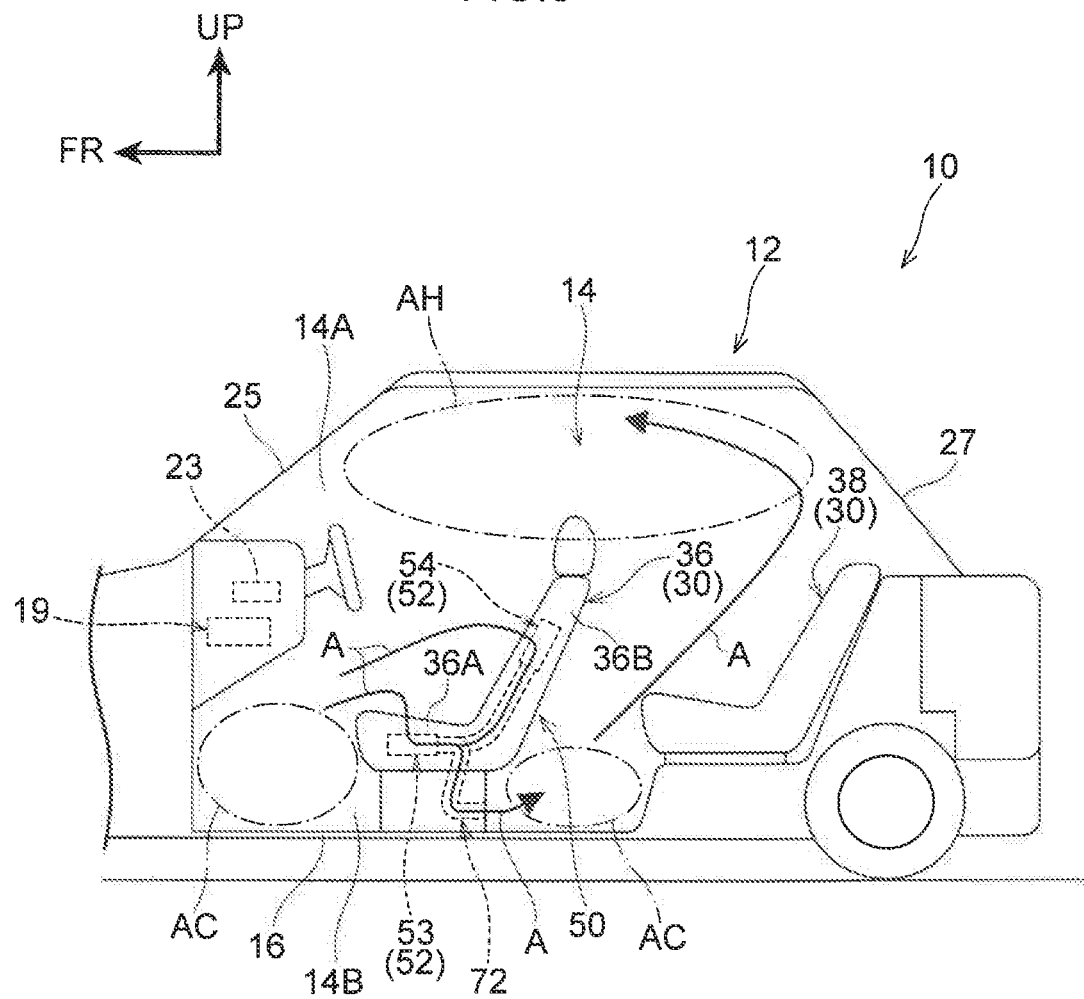
FIG. 6 is a descriptive diagram depicting flows of air in a cabin according to the first exemplary embodiment.

In summary, as shown in FIG. 6, the low-temperature air AC pooled in the cabin interior lower region 14B is sucked in via the seat cushion portion 36A and seat back portion 36B of the front seat 36 by operation of the first suction unit 53 and operation of the second suction unit 54. That is, the pooled low-temperature air AC flows toward the suction unit 52 of the front seat 36. Flows of the air AC are illustrated by arrows A. The air AC that has flowed toward the suction unit 52 is guided by the guide portion 72 toward the floor panel 16 side at the vehicle rear side relative to the front seat 36. Note that no vehicle occupant P is shown in FIG. 6.

Low-temperature air AC that has pooled at the floor panel 16 side at the vehicle rear side relative to the front seat 36 (at the front side of the rear seat 38) is pushed out to the vehicle rear side by a portion of the air AC guided by the guide portion 72. The air AC that is pushed out flows to the cabin interior upper region 14A along a wall portion (the rear seat 38) and a window portion (the rear window glass 27) at the rear side of the interior of the cabin 14.

Thus, in the vehicle air conditioning device 50, low-temperature air AC in the cabin interior lower region 14B is caused to flow via the seats 30 toward the cabin interior upper region 14A by the suction unit 52 and the guide portion 72. As a result, the high-temperature air AH in the cabin interior upper region 14A is cooled by the low-temperature air AC. Because the low-temperature air AC from the cabin interior lower region 14B is utilized, the temperature of the air AH in the cabin interior upper region 14A is brought closer to the temperature of the air AC in the cabin interior lower region 14B, but does not go to a low temperature below the temperature of the air AC in the cabin interior lower region 14B. Furthermore, because the air AC flows to the vehicle rear side relative to the seats 30, air at the rear side of the cabin interior is utilized effectively. Due to these operations, an increase in the difference between a temperature of the air AH in the cabin interior upper region 14A and a temperature of the air AC in the cabin interior lower region 14B may be suppressed.

Furthermore, in the vehicle air conditioning device 50, when the air AH in the cabin interior upper region 14A is to be cooled, the suction unit 52 sucks air via the front seat 36. Therefore, as well as air AC pooled over the floor panel 16 at the rear seat 38, air AC pooled over the floor panel 16 at the front side of the front seat 36 is utilized, and it is easier to cool the air in the cabin interior upper region 14A.

In the vehicle air conditioning device 50, air is sucked via the seat cushion portion 36A that is closer to the floor panel 16 than the seat back portion 36B. Therefore, the suction unit 52 may suck lower temperature air AC from closer to the floor panel 16 than in a configuration in which the suction unit 52 is provided only at the seat back portion 36B.

In addition, in the vehicle air conditioning device 50, air is sucked using both the first suction unit 53 at the seat cushion portion 36A and the second suction unit 54 at the seat back portion 36B. Therefore, cases in which amounts of air AC flowing to the vehicle rear side are insufficient with respect to air AC amounts required to lower the temperature of the air AH may be suppressed.

Second Exemplary Embodiment

Now, a vehicle air conditioning device 80 according to a second exemplary embodiment is described. Members and portions that are basically the same as in the first exemplary embodiment described above are assigned the same reference numerals as in the first exemplary embodiment and are not described.

Figure 7:
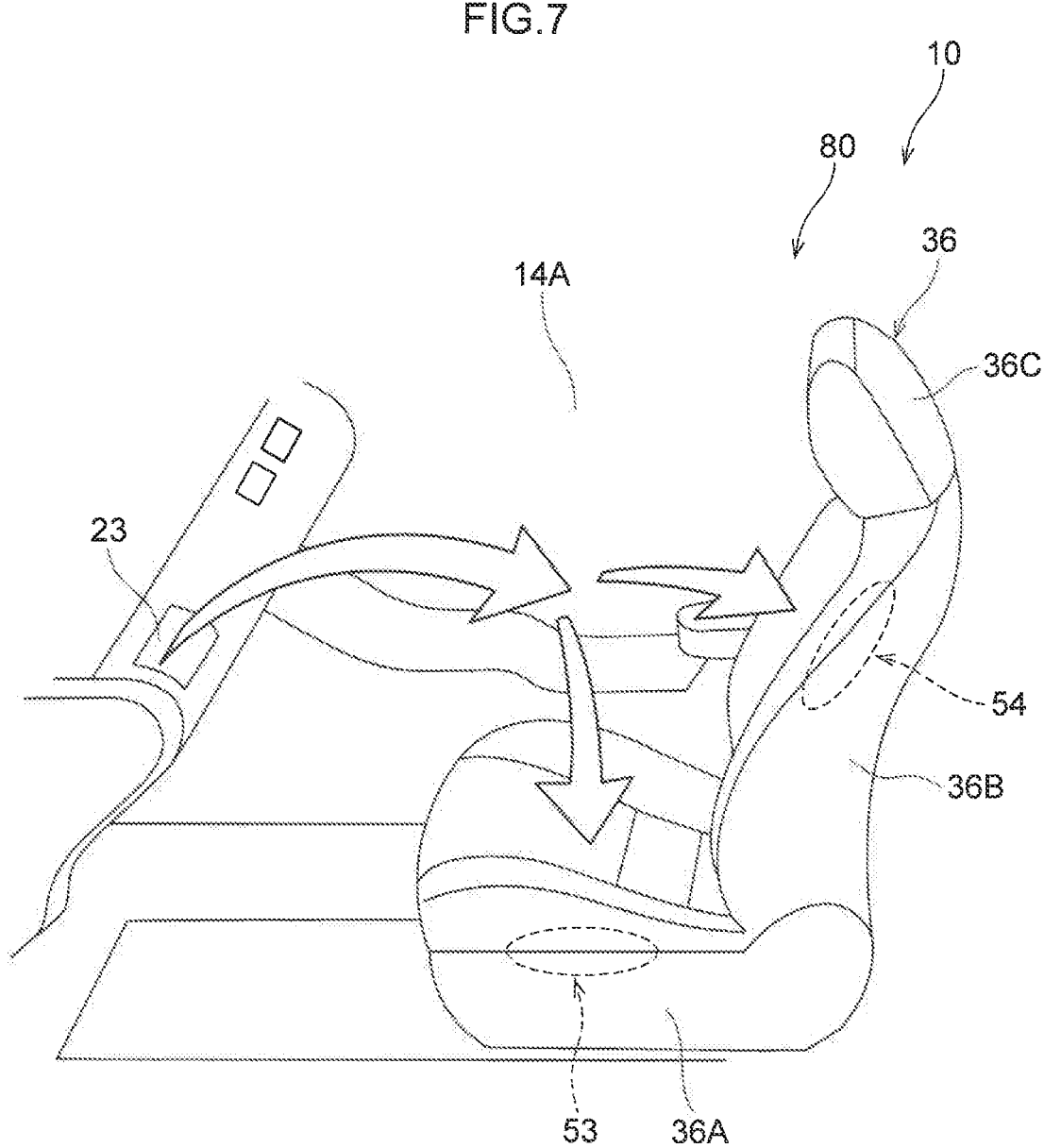
FIG. 7 is a descriptive diagram depicting flows of air from an air conditioner toward a seat cushion and seat back according to a second exemplary embodiment.

The vehicle air conditioning device 80 according to the second exemplary embodiment shown in FIG. 7 has a structure in which, in the vehicle 10 according to the first exemplary embodiment, the vehicle air conditioning device 50 (see FIG. 1) includes the air conditioner 23. That is, when operated in accordance with a switch operation, the first suction unit 53 and second suction unit 54 provided at the front seat 36 operate in combination with the air conditioner 23.

The air conditioner 23 is an example of a blowing section. As described above, the air conditioner 23 is provided at the vehicle front side relative to the front seat 36 and is capable of blowing air toward an upper portion or a lower portion of the front seat 36. For example, the air conditioner 23 is configured so as to blow air toward the upper side relative to the middle of the front seat 36 (toward the cabin interior upper region 14A). A portion of the air blown by the air conditioner 23 may be sucked by the first suction unit 53 and the second suction unit 54. When the air conditioner 23 is operating as the vehicle air conditioning device 80, for example, the air conditioner 23 is automatically configured so as to blow air at a temperature (for example, 23° C.) lower than the ambient temperature (blowing a cold wind).

Now, operation of the vehicle air conditioning device 80 according to the second exemplary embodiment is described.

In the vehicle 10 shown in FIG. 8A, when a switch (not shown in the drawings) is operated, the air conditioner 23 operates in addition to the first suction unit 53 and the second suction unit 54. Due to suction by the first suction unit 53 and second suction unit 54, air AC in the cabin interior lower region 14B at the front side of the front seat 36 flows via the front seat 36 to the side of the front seat 36 at which the rear seat 38 is disposed. Hence, air AC in the cabin interior lower region 14B at the front side of the rear seat 38 is pushed out upward. The air AC that is pushed out upward cools the air AH in the cabin interior upper region 14A.

Meanwhile, most of cool air AE that is blown from the air conditioner 23 flows toward the cabin interior upper region 14A at the upper portion of the front seat 36. This cool air cools both the air AC flowing from the vehicle rear side and the air AH. Another portion of the cold air AE is sucked by the first suction unit 53 and second suction unit 54, flows in the cabin 14 together with the air AC, and cools the air AH. Thus, in the vehicle air conditioning device 80, amounts of air being utilized for cooling of the air AH in the cabin interior upper region 14A may be increased compared to a configuration in which the air conditioner 23 is not employed as the blowing section. Here, when the air conditioner 23 blows air toward the upper portion of the front seat 36, a portion of the blown air flows toward the head area of a vehicle occupant P (see FIG. 1) and the vehicle occupant P is likely to feel a refreshing sensation.

FIG. 8B shows a state in which the air conditioner 23 of the vehicle air conditioning device 80 is blowing air (blowing the cold air AE) toward the cabin interior lower region 14B at the lower portion of the front seat 36. When the cold air AE is blown from the air conditioner 23 toward the lower portion of the front seat 36, the cold air AE that is blown is sucked by the first suction unit 53 and second suction unit 54 together with the air AC from the cabin interior lower region 14B. The sucked air flows from the cabin interior lower region 14B toward the cabin interior upper region 14A and cools the air AH. Therefore, amounts of air being utilized for cooling of the air AH in the cabin interior upper region 14A may be increased compared to a configuration in which the air conditioner 23 is not employed as the blowing section. When the air conditioner 23 blows air toward the lower portion of the front seat 36, the blown air is less likely to flow toward the head area of the vehicle occupant P (see FIG. 1). Therefore, if the vehicle occupant P does not want a wind blowing against their face, an unpleasant sensation for the vehicle occupant P during cooling of the air AH may be suppressed.

Third Exemplary Embodiment

Now, a vehicle air conditioning device 90 according to a third exemplary embodiment is described. Members and portions that are basically the same as in the first and second exemplary embodiments described above are assigned the same reference numerals as in the first and second exemplary embodiments and are not described.

Figure 9:
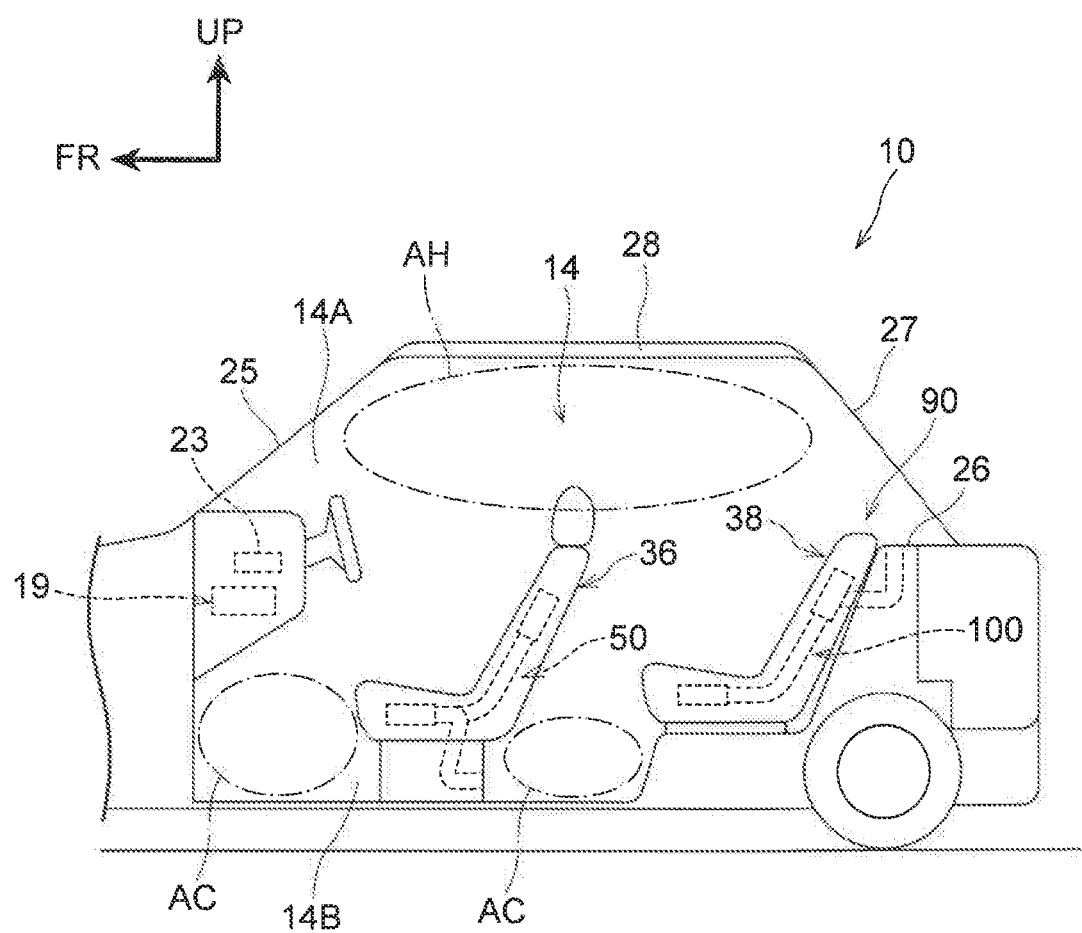
FIG. 9 is a structural diagram of a vehicle in which a vehicle air conditioning device according to a third exemplary embodiment is employed.

The vehicle air conditioning device 90 according to the third exemplary embodiment shown in FIG. 9 includes the vehicle air conditioning device 50 provided at the front seat 36 and a vehicle air conditioning device 100 that is provided at the rear seat 38.

Figure 10:
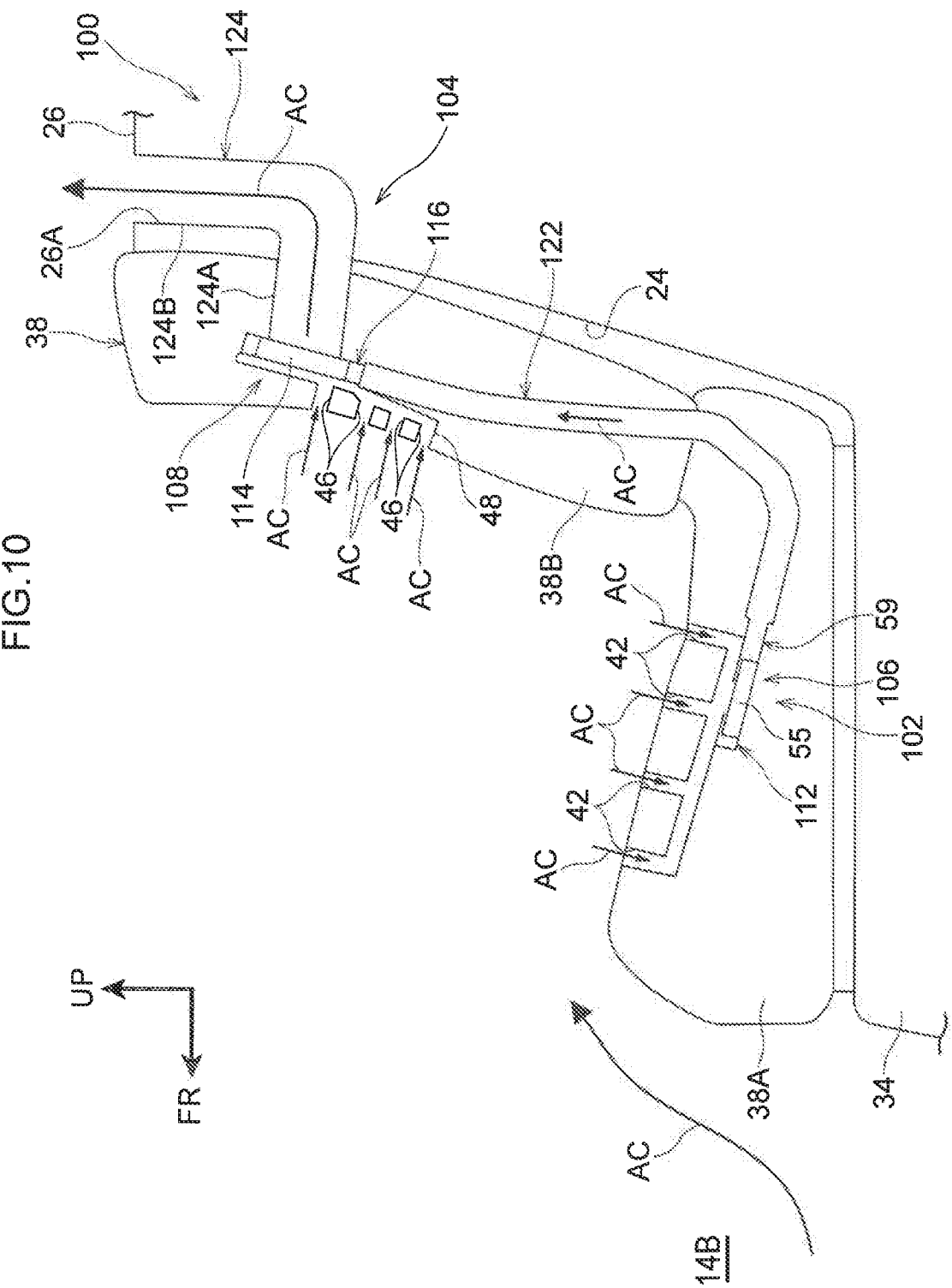
FIG. 10 is a descriptive diagram depicting flows of air at a rear seat according to the third exemplary embodiment.

The vehicle air conditioning device 100 shown in FIG. 10 includes, for example, a suction unit 102 that sucks air via the rear seat 38 and a guide portion 104 that guides the air sucked by the suction unit 102 in the rear seat 38 toward the vehicle upper side of the rear seat 38. The suction unit 102 is an example of the sucking section, and the guide portion 104 is an example of the guiding section.

In the rear seat 38, plural ventilation holes 42 are formed for suction in a cover material and seat pad of the seat cushion portion 38A. The channel member 44 is connected to the plural ventilation holes 42. The end portion of the channel member 44 is connected to a blower case 112, which is described below. A number of the ventilation holes 46 are formed for suction in a covering material and seat pad of the seat back portion 38B. The channel member 48 is connected to the plural ventilation holes 46. The end portion of the channel member 48 is connected to a fan case 116, which is described below.

The suction unit 102 includes, for example, a third suction unit 106 that sucks air via the seat cushion portion 38A and a fourth suction unit 108 that sucks air via the seat back portion 38B. Operation control of the third suction unit 106 and the fourth suction unit 108 is controlled by the control unit 19, which is described above (see FIG. 1).

The third suction unit 106 includes, for example, another of the first blower 55, which sucks air, and the blower case 112, which guides the air sucked by the first blower 55 in one direction. The blower case 112 has a structure in which the inflow portion 58 (see FIG. 3) of the blower case 56 described above (see FIG. 3) is closed off and the exhaust portion 59 (see FIG. 3) is opened up.

The fourth suction unit 108 includes, for example, a fan 114 that sucks air and the fan case 116. The fan case 116 encircles the outer periphery of the fan 114 and guides the air sucked by the fan 114 in one direction. The fan 114 is structured by an axial flow fan in which air flows substantially in the vehicle front-and-rear direction. The fan 114 is rotated together with the first blower 55 when a switch is switched from an off state to an on state by a vehicle occupant P. The fan case 116 is connected to the channel member 48 such that air inflows from the channel member 48. A portion of the fan case 116 is opened up to the vehicle rear side such that air is caused to flow in a blowing direction by the rotation of the fan 114.

Thus, the suction unit 102 is provided at the rear seat 38 and is structured so as to suck air via the rear seat 38 from the cabin interior lower region 14B at the vehicle front side relative to the rear seat 38.

The guide portion 104 includes, for example, a third duct 122 that guides air from the third suction unit 106 toward the fourth suction unit 108 and a fourth duct 124 that guides air from the fourth suction unit 108 toward the vehicle upper side.

The third duct 122 has, for example, a similar structure to the second duct 76 (see FIG. 4). A lower end portion of the third duct 122 is connected to the exhaust portion 59 of the blower case 112, and an upper end portion of the third duct 122 is connected to the fan case 116. Therefore, air sucked by the third suction unit 106 is guided by the third duct 122 and flows (ascends) toward the fourth suction unit 108.

The fourth duct 124 is, for example, constituted of a resiliently deformable resin material, formed in a square tube shape, and capable of distributing air thereinside. Viewed in the vehicle width direction, the fourth duct 124 as a whole is, for example, inflected in a substantial "L" shape. To be specific, the fourth duct 124 includes an upstream portion 124A and a downstream portion 124B. Viewed in the vehicle width direction, the upstream portion 124A is connected to the fan case 116 and air from the fan 114 inflows into the upstream portion 124A. The downstream portion 124B extends to the vehicle upper side from a downstream side end portion of the upstream portion 124A and exhausts the air.

More specifically, the upstream portion 124A extends, for example, to the rear side in the vehicle front-and-rear direction from the seat back portion 38B. The upstream portion 124A extends further to the vehicle rear side than the compartment partition panel 24. The downstream portion 124B extends to the vehicle upper side in the vehicle vertical direction from the downstream side end portion of the upstream portion 124A. A downstream side end portion of the downstream portion 124B is connected to a peripheral edge portion of an aperture portion 26A that is formed in the upper back panel 26 and opens to the vehicle upper side. Therefore, air that inflows into the fourth duct 124 from the fourth suction unit 108 and flows in the fourth duct 124 then flows toward the vehicle upper side from the aperture portion 26A.

Now, operation of the vehicle air conditioning device 90 according to the third exemplary embodiment is described.

Figure 11:
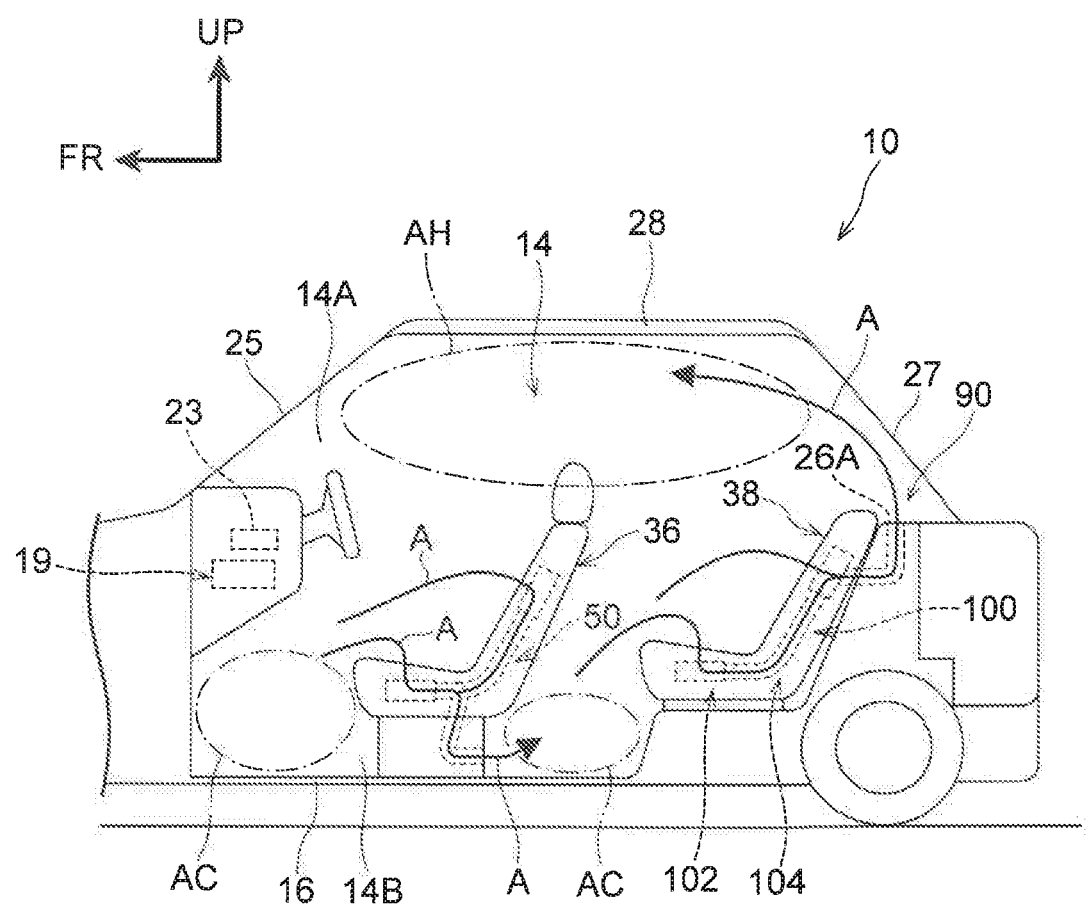
FIG. 11 is a descriptive diagram depicting flows of air in a cabin according to the third exemplary embodiment.

In the vehicle 10 shown in FIG. 11, when a vehicle occupant P operates a switch (not shown in the drawings) the vehicle air conditioning device 90 is operated. To be specific, the vehicle air conditioning device 50 causes air AC in the cabin interior lower region 14B to flow via the front seat 36 to the front side of the rear seat 38. As a result, air AC that has pooled at the front side of the rear seat 38 is pushed out to the vehicle upper side.

In the vehicle air conditioning device 100 shown in FIG. 10, the first blower 55 of the third suction unit 106 and the fan 114 of the fourth suction unit 108 are rotated. A portion of the air AC pushed out to the vehicle upper side from the front side of the rear seat 38 is sucked into the blower case 112 through the plural ventilation holes 42 and the channel member 44 by the rotation of the first blower 55. This sucked air AC flows in the exhaust portion 59 and in the third duct 122, and inflows into the fan case 116.

Meanwhile, another portion of the air AC pushed out to the vehicle upper side is sucked into the fan case 116 through the plural ventilation holes 46 and the channel member 48 by the rotation of the fan 114. This sucked air AC merges with the air AC inflowing through the third suction unit 106 into the fan case 116, flows in the fourth duct 124, and flows to the vehicle upper side from the aperture portion 26A.

As shown in FIG. 11, the low-temperature air AC flowing to the vehicle upper side from the aperture portion 26A flows to the vehicle upper side along the rear window glass 27 and reaches the cabin interior upper region 14A. As a result, the high-temperature air AH in the cabin interior upper region 14A is cooled by the air AC. Thus, in the vehicle air conditioning device 90, the low-temperature air AC at the vehicle front side and the vehicle rear side of the cabin interior lower region 14B is utilized effectively to cool the high-temperature air AH in the cabin interior upper region 14A. Therefore, an increase in the difference between the temperature of the air AH in the cabin interior upper region 14A and the temperature of the air AC in the cabin interior lower region 14B may be suppressed.

Furthermore, in the vehicle air conditioning device 90, the air AC over the floor panel 16 at the rear seat 38 is sucked by the suction unit 102 and is guided to the vehicle upper side by the guide portion 104. That is, the air AC over the floor panel 16 at the front side of the rear seat 38 is actively caused to flow toward the cabin interior upper region 14A. Therefore, when the high-temperature air AH in the cabin interior upper region 14A is to be cooled, air amounts flowing toward the cabin interior upper region 14A may be increased compared to a configuration in which the suction unit 102 and guide portion 104 are not provided at the rear seat 38.

Fourth Exemplary Embodiment

Now, a vehicle air conditioning device 130 according to a fourth exemplary embodiment is described. Members and portions that are basically the same as in the first to third exemplary embodiments described above are assigned the same reference numerals as in the first to third exemplary embodiments and are not described.

Figure 12A:
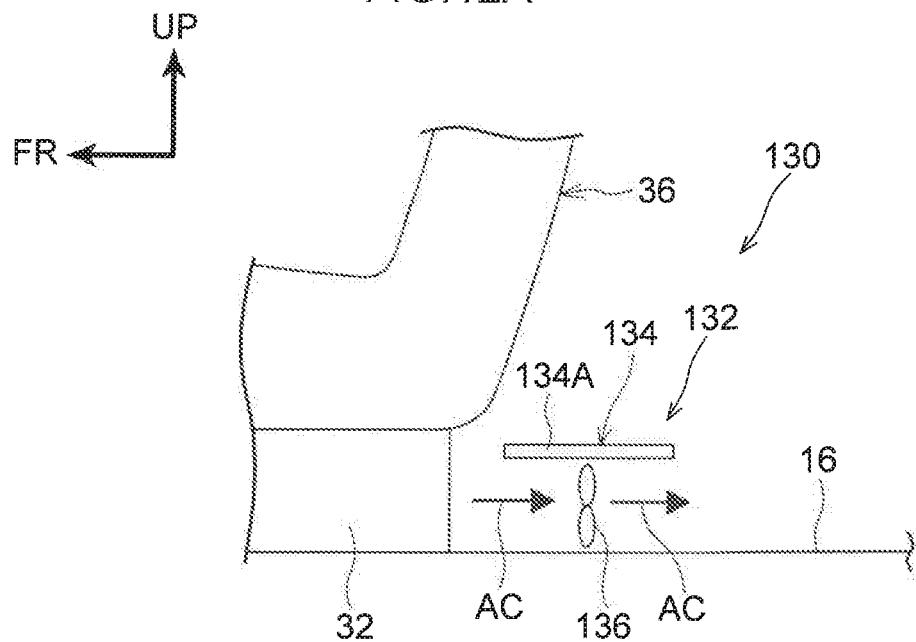
FIG. 12A is a descriptive diagram showing a floor blowing unit of a vehicle air conditioning device according to a fourth exemplary embodiment.
Figure 12B:
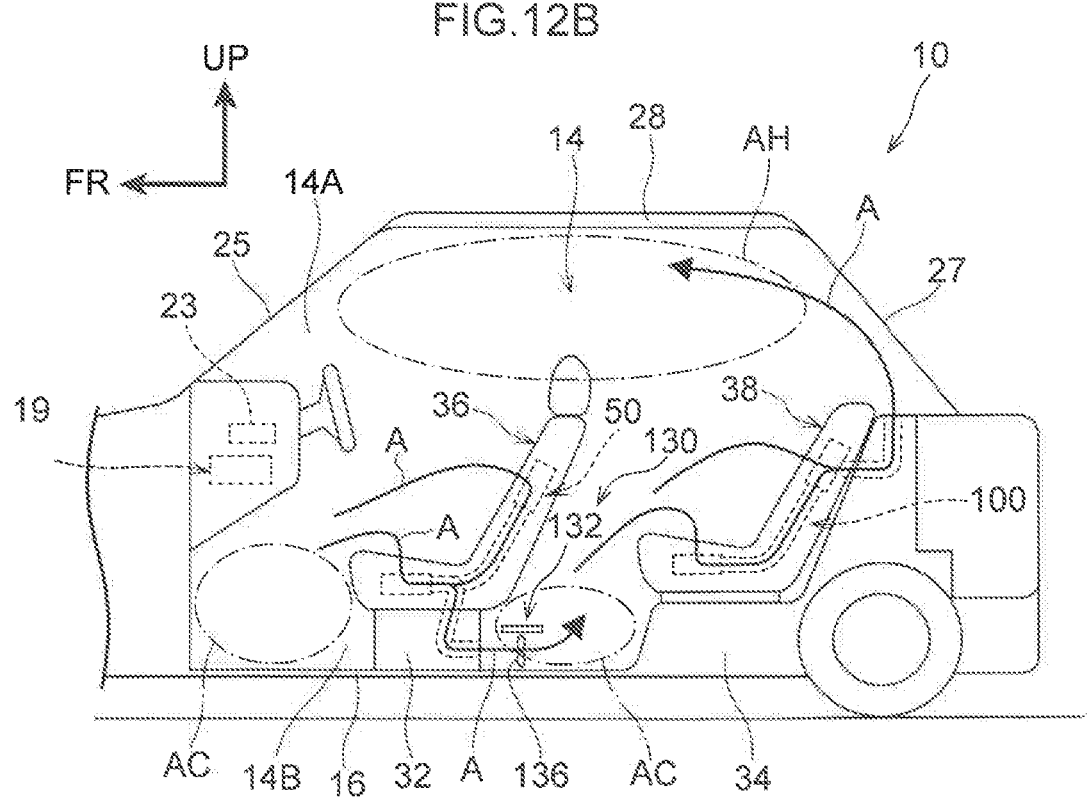
FIG. 12B is a descriptive diagram depicting flows of air in a cabin according to the fourth exemplary embodiment.

The vehicle air conditioning device 130 shown in FIG. 12B has a structure in which a floor blowing unit 132 that serves as an example of the blowing section is added to the vehicle air conditioning device 90 according to the third exemplary embodiment (see FIG. 9). The floor blowing unit 132 is provided on the floor panel 16 at the vehicle front side relative to the rear seat 38, at the rear side relative to the front seat 36. The floor blowing unit 132 blows air toward the rear seat 38. The floor blowing unit 132 also functions as a footrest for a vehicle occupant sitting on the rear seat 38, who is not shown in the drawings.

As shown in FIG. 12A, the floor blowing unit 132 includes a channel member 134 and a fan 136.

The channel member 134 is structured by an upper wall 134A in a plate shape, which is disposed to oppose the floor panel 16, and side walls (not shown in the drawings) that link between the upper wall 134A and the floor panel 16. Viewed in the vehicle front-and-rear direction, the channel member 134 together with the floor panel 16 is formed in a square tube shape, of which both of vehicle front-and-rear direction end portions are open. Thus, air can flow at the inside of the channel member 134.

The fan 136 is provided at the inside of the channel member 134 to be rotatable with an axial direction thereof in the vehicle front-and-rear direction. Rotation operations of the fan 136 are implemented when a vehicle occupant operates a switch that is not shown in the drawings. When the fan 136 rotates, air AC flows in the channel member 134 from the front side toward the rear side. A filter (not shown in the drawings) is provided at the rear side of the interior of the channel member 134 relative to the fan 136. The filter collects dust and the like when air is blown by the fan 136.

Now, operation of the vehicle air conditioning device 130 according to the fourth exemplary embodiment is described.

In the vehicle 10 shown in FIG. 12B, the vehicle air conditioning device 130 is operated when a vehicle occupant operates a switch (not shown in the drawings). To be specific, the vehicle air conditioning device 50 at the front seat 36 side operates and the vehicle air conditioning device 100 at the rear seat 38 side operates. As a result, air AC at the front side of the front seat 36 flows via the front seat 36 to the side thereof at which the rear seat 38 is disposed. Hence, air AC at the front side of the rear seat 38 is pushed out by the air AC flowing from the side thereof at which the front seat 36 is disposed and flows to the vehicle upper side. The air AC flowing to the vehicle upper side flows to the cabin interior upper region 14A via the rear seat 38 and cools the air AH. At this time, the fan 136 is in a stationary state.

If the air AH in the cabin interior upper region 14A is to be cooled further, the vehicle occupant operates a switch that is not shown in the drawings and the fan 136 starts to rotate. Thus, air is blown toward the rear seat 38 by the floor blowing unit 132. As a result, air AC is fed into the floor blowing unit 132 from the front seat 36 and an amount of the air AC flowing toward the rear seat 38 increases. Therefore, an amount of the air AC that is being utilized for cooling of the air AH in the cabin interior upper region 14A may be increased compared to a configuration in which there is no floor blowing unit 132.

Fifth Exemplary Embodiment

Now, a vehicle air conditioning device 140 according to a fifth exemplary embodiment is described. Members and portions that are basically the same as in the first to fourth exemplary embodiments described above are assigned the same reference numerals as in the first to fourth exemplary embodiments and are not described.

The vehicle air conditioning device 140 shown in FIG. 13 has a structure in which a flow-straightening member 142 that serves as an example of a flow-straightening section is added to the vehicle air conditioning device 130 according to the fourth exemplary embodiment (see FIG. 12B). The flow-straightening member 142 is structured as, for example, a long, narrow member that is longest in the vehicle width direction, which is provided in the cabin 14 to span in the vehicle front-and-rear direction between an upper end portion of the rear window glass 27 and a rear end portion of the roof panel 28.

Figure 14A:
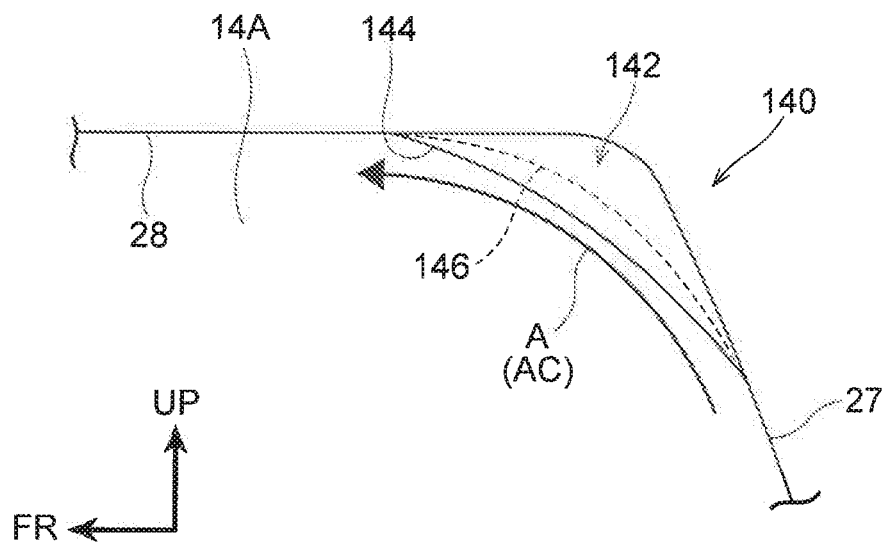
FIG. 14A is a side view of the flow-straightening member according to the fifth exemplary embodiment.

The flow-straightening member 142 shown in FIG. 14A is constituted of, for example, an acrylic resin that is transparent to light. A profile of the flow-straightening member 142 viewed in the vehicle width direction is formed substantially in a crescent moon shape. The flow-straightening member 142 is fixed to the upper end portion of the rear window glass 27 and the rear end portion of the roof panel 28 using fixing means such as adhesive, screws or the like. Curved surfaces 144 are formed at an end portion at the side of the flow-straightening member 142 that is further from the rear window glass 27 and the roof panel 28, so as to guide air toward the cabin interior upper region 14A. Viewed in the vehicle width direction, each of the curved surfaces 144 is formed in a circular arc shape arching toward the side thereof at which the rear window glass 27 and the roof panel 28 are disposed. Therefore, when the air AC comes into contact with the curved surfaces 144, the air AC is guided along the curved surfaces 144 toward the vehicle front side of the cabin interior upper region 14A.

Figure 14B:
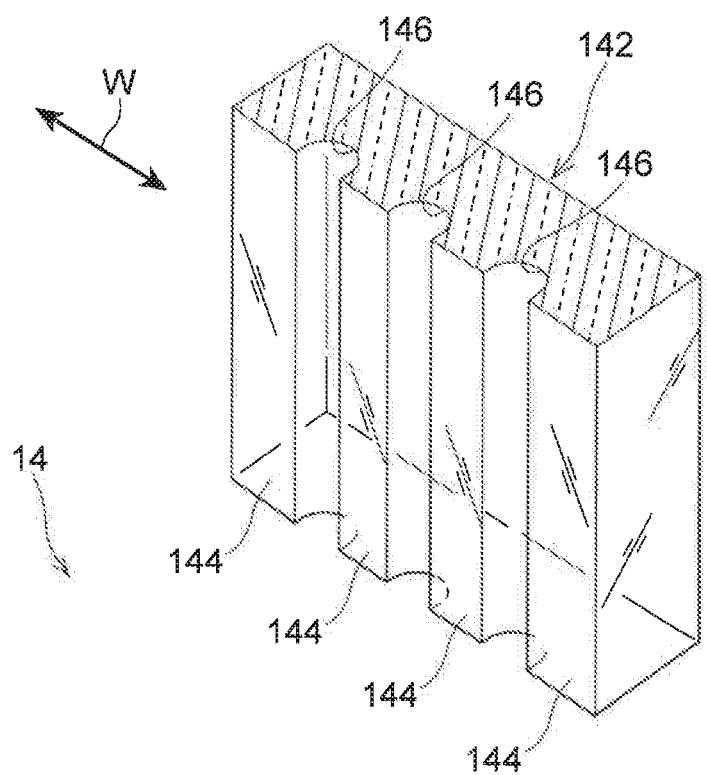
FIG. 14B is a partially enlarged view of the flow-straightening member according to the fifth exemplary embodiment.

As shown in FIG. 14B, plural groove portions 146 that open toward the inner side of the cabin 14 are formed in the flow-straightening member 142. The plural groove portions 146 are arrayed, spaced apart, in the vehicle width direction (indicated by arrow W). As shown in FIG. 14A, the groove portions 146 extend from the upper end portion of the rear window glass 27 to the rear end portion of the roof panel 28. A cross-sectional shape of each of the groove portions 146 viewed in the direction of extension thereof is formed in a substantial "U" shape. The curved surfaces 144 are disposed between adjacent groove portions 146.

The plural groove portions 146 are structured such that when a portion of the air AC flowing to the cabin interior upper region 14A inflows into the groove portions 146 and comes into contact with wall faces of the groove portions 146, the direction of flow of the air AC is straightened (aligned) in one direction toward the front seat 36 (see FIG. 12B). Thus, the flow-straightening member 142 shown in FIG. 13 is configured to straighten flows of air from the rear seat 38 toward the front seat 36 (see FIG. 12B).

Now, operation of the vehicle air conditioning device 140 according to the fifth exemplary embodiment is described.

Figure 15:
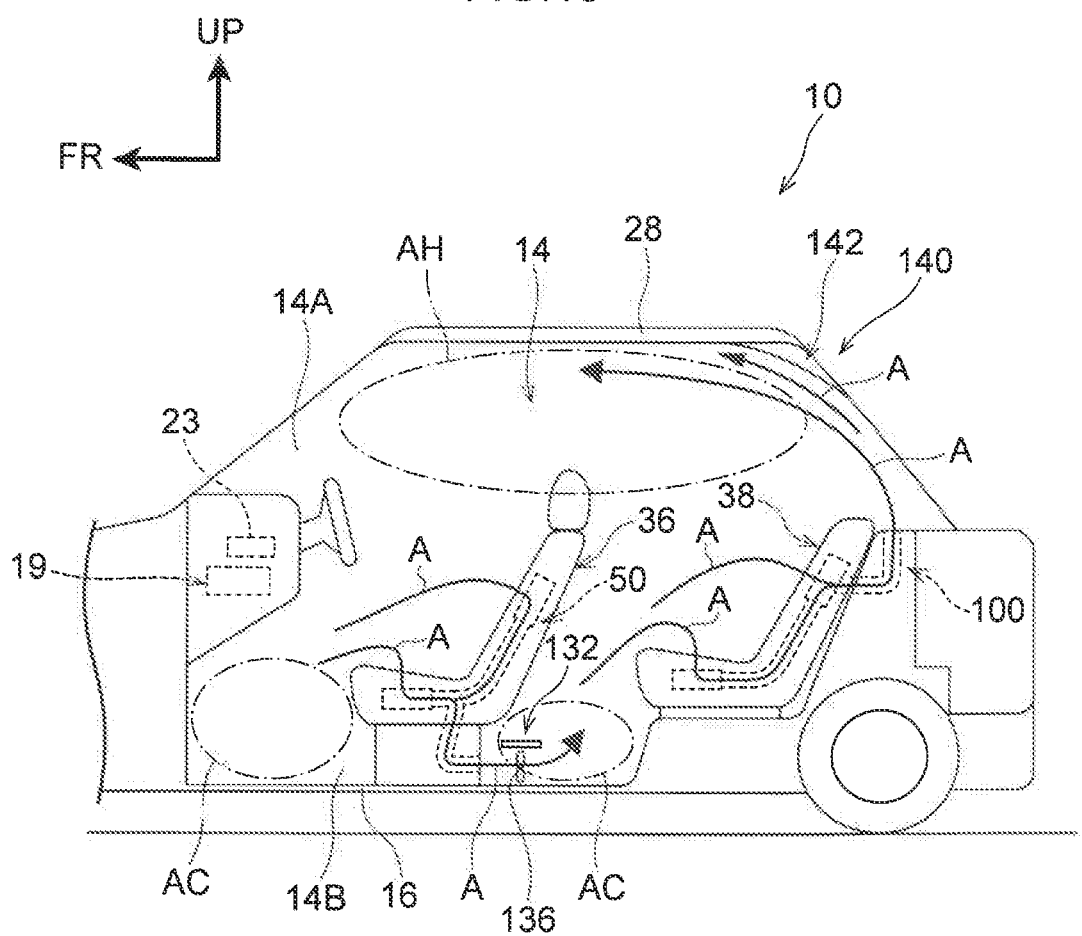
FIG. 15 is a descriptive diagram depicting flows of air in a cabin according to the fifth exemplary embodiment.

In the vehicle 10 shown in FIG. 15, when a vehicle occupant operates a switch (not shown in the drawings) the vehicle air conditioning device 140 operates. As a result, air AC at the front side of the front seat 36 flows via the front seat 36 to the side thereof at which the rear seat 38 is disposed. Hence, air AC at the front side of the rear seat 38 is pushed out by the air AC being caused to flow from the side at which the front seat 36 is disposed by rotation of the fan 136 and the like, and this air AC flows to the vehicle upper side. The air AC flowing to the vehicle upper side flows to the cabin interior upper region 14A via the rear seat 38 and cools the air AH.

Of the air AC flowing to the vehicle upper side from the rear seat 38 (indicated by arrow A), flows of air AC that is flowing in the vicinity of the rear window glass 27 are straightened by the flow-straightening member 142, and flow toward the side of the cabin interior upper region 14A at which the front seat 36 is disposed. Therefore, a mass (that is resistant to dispersion) of air AC may be brought into contact with the air AH pooled in the cabin interior upper region 14A, in contrast to a case in which air AC whose flow directions diverge in plural directions is brought into contact with the air AH. Consequently, it is easier to lower the temperature of the air AH in the cabin interior upper region 14A than in a configuration in which there is no flow-straightening member 142.

The flow-straightening member 142 of the vehicle air conditioning device 140 extends in the cabin 14 from the upper end portion of the rear window glass 27 to the rear end portion of the roof panel 28. That is, the flow-straightening member 142 projects to the inner side of the cabin 14 relative to the rear end portion of the roof panel 28. Therefore, pooling of air AC in the vicinity of the rear end portion of the roof panel 28 may be suppressed compared to a configuration in which there is no flow-straightening member 142.

The present disclosure is not limited by the exemplary embodiments described above.

First Alternative Exemplary Embodiment

Figure 16A:
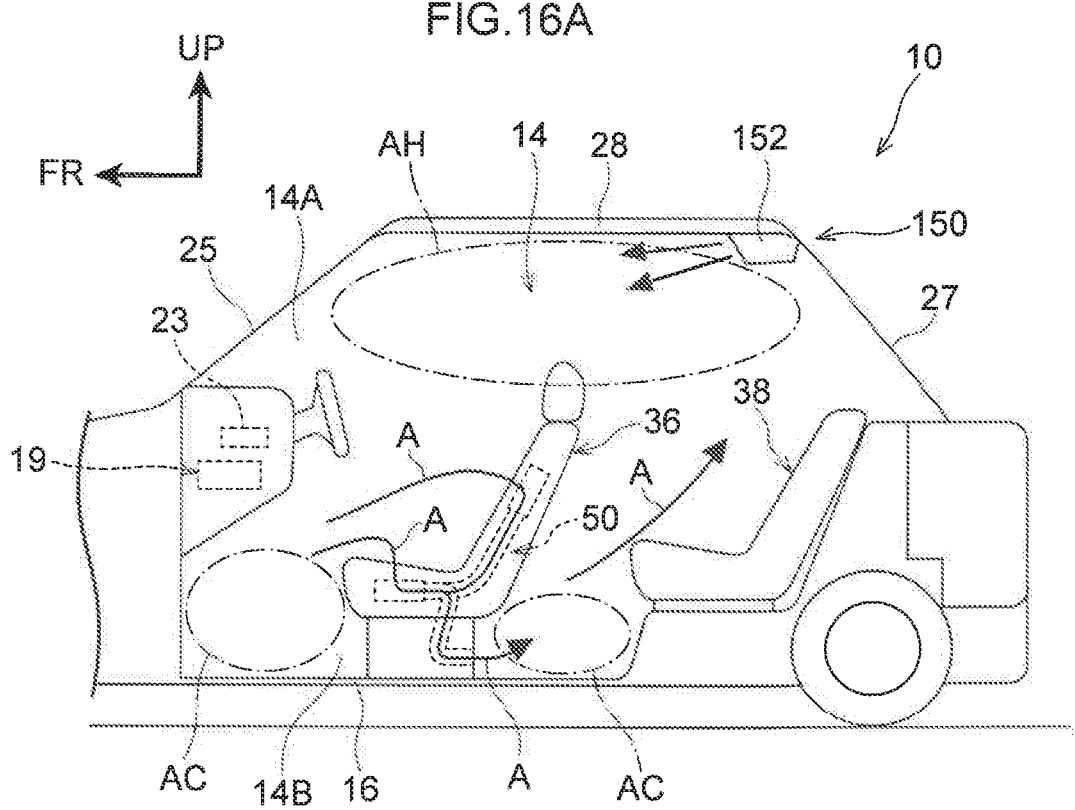
FIG. 16A is a descriptive diagram depicting flows of air in a cabin in which a circulator according to a first alternative exemplary embodiment is employed.

FIG. 16A shows structures of a vehicle air conditioning device 150 according to a first alternative exemplary embodiment, in which a circulator 152 that serves as an auxiliary blowing section is added to the vehicle air conditioning device 50 in the vehicle 10. The circulator 152 is mounted at the rear end portion of the roof panel 28 at the cabin 14 side thereof, and blows air towards the vehicle front side (the side of the circulator 152 at which the front seat 36 is disposed). Operation of the circulator 152 is implemented when a switch that is not shown in the drawings is operated.

Air AC that flows to a vicinity of the upper end portion of the rear window glass 27 and a vicinity of the rear end portion of the roof panel 28 (indicated by arrow A) is actively caused to flow toward the vehicle front side of the cabin interior upper region 14A by the operation of the circulator 152. As a result, it is easier to lower the temperature of the air AH in the cabin interior upper region 14A than in a configuration in which there is no circulator 152.

Second Alternative Exemplary Embodiment

Figure 16B:
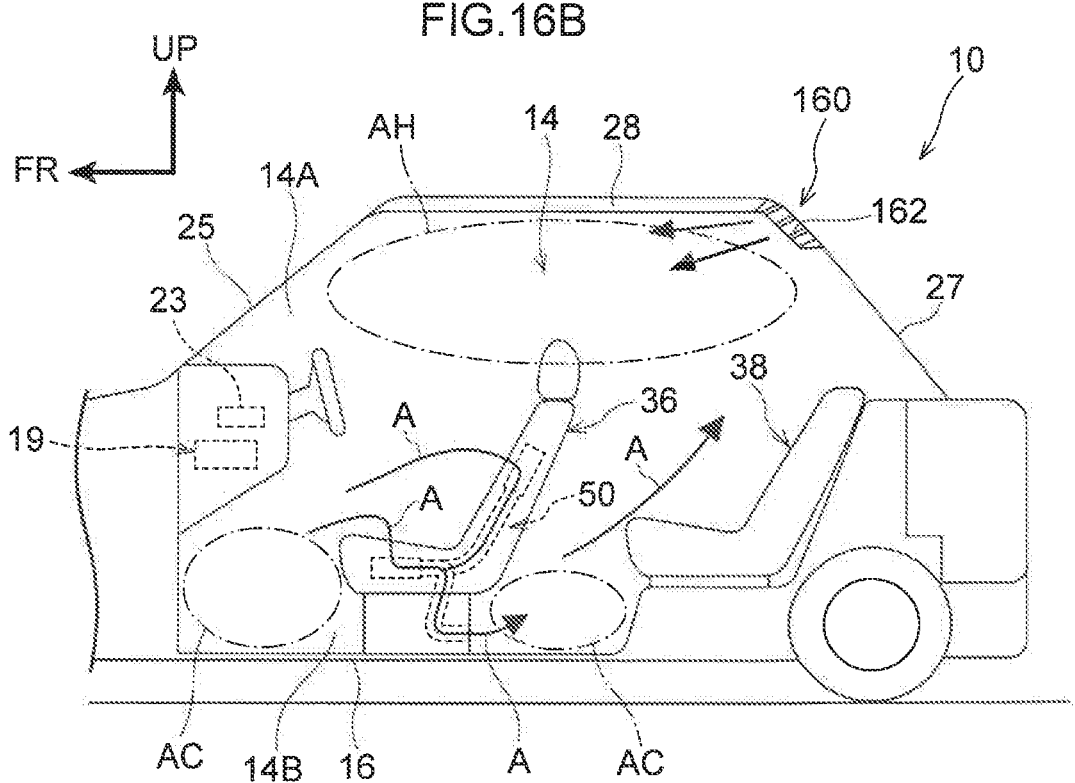
FIG. 16B is a descriptive diagram depicting flows of air in a cabin in which a louver according to a second alternative exemplary embodiment is employed.

FIG. 16B shows structures of a vehicle air conditioning device 160 according to a second alternative exemplary embodiment, in which a louver 162 that serves as an air circulating section is added to the vehicle air conditioning device 50 in the vehicle 10. The louver 162 is formed at the rear end portion of the roof panel 28 and puts the inside and the outside of the cabin 14 into fluid communication. That is, air from outside the cabin 14 may inflow into the cabin 14 via the louver 162 inside the cabin 14. The air inflowing into the cabin 14 via the louver 162 simply flows toward the vehicle front side.

Air AC flowing to the vicinity of the rear end portion of the roof panel 28 from the rear seat 38 (indicated by arrow A) is caused to flow to the vehicle front side of the cabin interior upper region 14A by the air inflowing into the cabin 14 via the louver 162. As a result, it is easier to lower the temperature of the air AH in the cabin interior upper region 14A than in a configuration in which there is no louver 162.

Third Alternative Exemplary Embodiment

Figure 17:
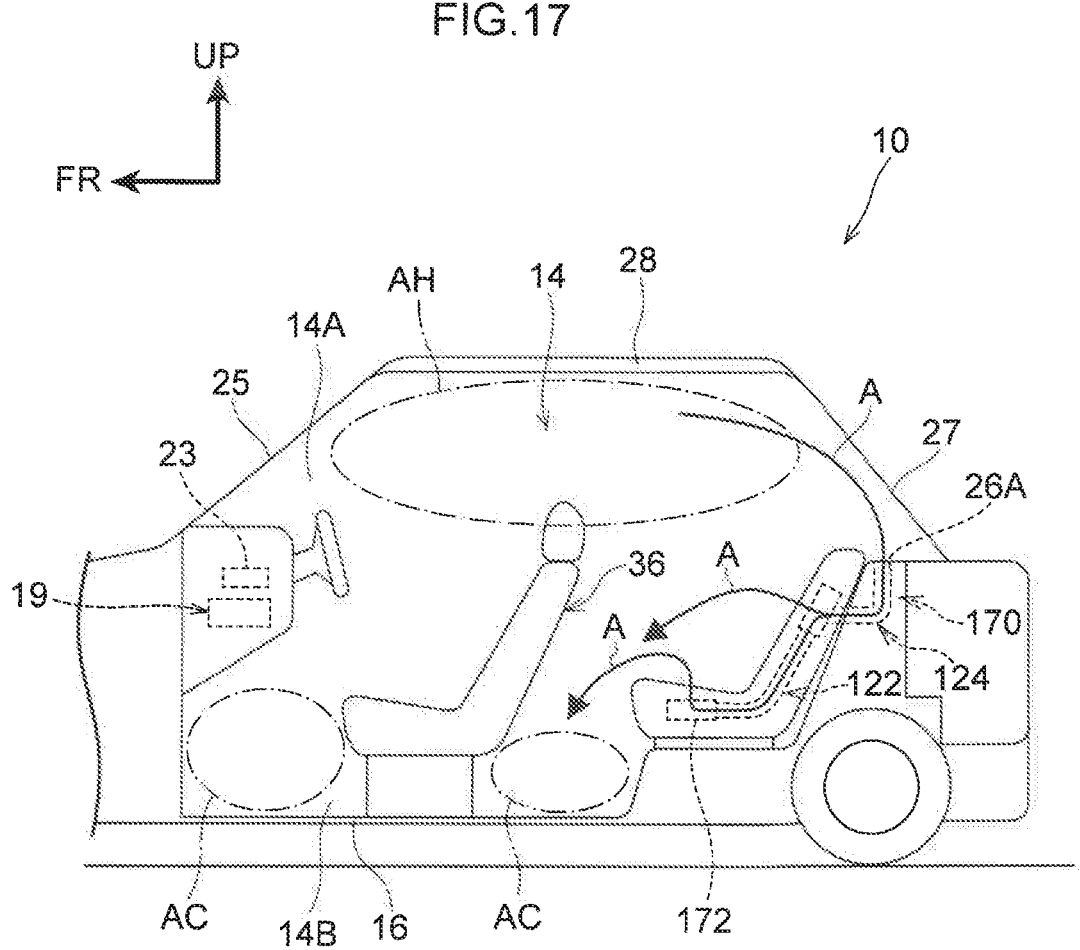
FIG. 17 is a descriptive diagram depicting flows of air in a cabin in which a vehicle air conditioning device according to a third alternative exemplary embodiment is employed.

FIG. 17 shows the structures of a vehicle air conditioning device 170 according to a third alternative exemplary embodiment, in which a first fan 172 and a second fan 174 are provided in place of the first blower 55 and fan 114 (see FIG. 10) of the vehicle air conditioning device 100 (see FIG. 10). The first fan 172 and second fan 174 are each configured to be switchable between a suction mode and a discharge mode. When the first fan 172 and the second fan 174 are operated in the suction mode, air from the vehicle front side is sucked via the rear seat 38 and air AC flows to the vehicle upper side of the rear seat 38 (see FIG. 11).

On the other hand, when the first fan 172 and the second fan 174 are operated in the discharge mode, a portion of the air AH in the cabin interior upper region 14A inflows through the aperture portion 26B into the fourth duct 124. Then, the air AH inflowing into the fourth duct 124 is discharged to the vehicle front side from the second fan 174 or flows into the third duct 122 and is discharged to the vehicle front side from the first fan 172. Thus, the air AC over the floor panel 16 is warmed by the air AH flowing to the vehicle front side of the rear seat 38.

Thus, by use of the first fan 172 and second fan 174 with the suction mode and the discharge mode, for example, the air AC may be used to cool the air AH in summer and the air AH may be used to warm the air AC in winter.

Further Alternative Exemplary Embodiment

The vehicle air conditioning device 90 may be configured with only the vehicle air conditioning device 100 being provided and the vehicle air conditioning device 50 not being provided. Further, in the vehicle air conditioning device 90, there may be no suction via the seat back portions 36B and 38B, with suction only being implemented via the seat cushion portions 36A and 38A. In the vehicle air conditioning device 90, there may be no suction via the seat cushion portions 36A and 38A, with suction and discharge only being implemented via the seat back portions 36B and 38B. That is, air may flow directly to the vehicle rear side without air from the seat back portions 36B and 38B being gathered into the seat cushion portions 36A and 38A.

In a vehicle in which a middle seat is disposed between the front seat 36 and the rear seat 38, a vehicle air conditioning device may be provided at the middle seat, and air may be sucked via the middle seat and flow to the side thereof at which the rear seat 38 is disposed.

Numbers of blowers, numbers of ducts and numbers of fans are not limited to the numbers employed in the exemplary embodiments and may be different numbers. That is, the number of blowers, number of ducts and number of fans that are employed may be singular and may be plural. The first blower 55 and the second blower 62 are not limited to being turbo fans but may be sirocco fans.

Structures that suck air via the seat cushion portions 36A and 38A are not limited to structures that suck air through the upper face sides of the seat cushion portions 36A and 38A but may be structures that suck air through front face sides of the seat cushion portions 36A and 38A.

Hereabove, examples of the vehicle air conditioning device have been described in accordance with the exemplary embodiments and alternative exemplary embodiments of the present disclosure, but the exemplary embodiments and alternative exemplary embodiments may be employed in suitable combinations; it will be clear that numerous modes may be embodied within a technical scope not departing from the gist of the present disclosure.

What is claimed is:

1. A vehicle air conditioning device, comprising:
a sucking section provided at a seat that is disposed over a floor portion of a cabin, the sucking section configured to suck air via the seat from a vehicle front side relative to the seat, from a floor portion side relative to a vehicle vertical direction; and
a guiding section configured to guide air sucked by the sucking section toward a vehicle upper side from a back side of the seat, wherein:
the guiding section includes a first duct and a second duct;
the second duct includes an aperture portion with a fixed outlet angle and that opens vertically upward towards the vehicle upper side, and the guiding section guides air that has been sucked by the sucking section toward the vehicle upper side from the aperture portion, the seat includes a seat back portion and a seat cushion portion, a lower portion of the seat back portion contacting the seat cushion portion, the first duct extends from an inside of the seat cushion portion to an inside of the seat back portion and the first duct extends from the inside of the seat cushion portion to the inside of the seat back portion by passing through a portion at which the lower portion of the seat back portion and the seat cushion portion contact each other, a first end of the first duct is provided within the seat cushion portion, a second end of the first duct is provided within the seat back portion, an entire length of the first duct from the first end to the second end is provided within the seat, and the second end of the first duct is positioned at an upper portion of the seat back portion, the second duct is connected to the first duct, and the second duct is formed in an L-shape that extends to a vehicle rear side and then extends to the vehicle upper side.

2. The vehicle air conditioning device according to claim 1, wherein
the seat includes a rear seat;
the sucking section is configured to suck air via at least the rear seat, and
the guiding section is configured to guide air sucked by the sucking section at the rear seat toward the vehicle upper side.

3. The vehicle air conditioning device according to claim 1, wherein the sucking section is configured to suck air via the seat cushion portion.

4. The vehicle air conditioning device according to claim 1, further comprising a blowing section at the vehicle front side relative to the seat configured to blow air toward the seat.

5. The vehicle air conditioning device according to claim 1, wherein:
the seat includes a front seat and a rear seat;
the sucking section is configured to suck air via the rear seat, and
the guiding section is configured to guide air sucked by the sucking section at the rear seat toward the vehicle upper side; and
a flow-straightening section configured to straighten a flow of air from the rear seat toward the front seat is provided in the cabin.

6. The vehicle air conditioning device according to claim 1, wherein:
the sucking section includes a first suction unit that sucks air via the seat cushion portion and a second suction unit that sucks air via the seat back portion, and
the first duct guides air that has been sucked by the first suction unit to the second suction unit.

* * * * *